(12) United States Patent
Cragun

(10) Patent No.: US 6,774,920 B1
(45) Date of Patent: Aug. 10, 2004

(54) COMPUTER ASSISTED PRESENTATION METHOD AND APPARATUS

(75) Inventor: Brian John Cragun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 432 days.

(21) Appl. No.: 09/704,151

(22) Filed: Nov. 1, 2000

(51) Int. Cl.$^7$ .................................................. G09G 5/00

(52) U.S. Cl. ...................................... 345/730; 345/732

(58) Field of Search ................................. 345/730, 732, 345/731, 720, 723, 772, 744; 434/314, 315, 316, 307 R, 310, 309

(56) References Cited

U.S. PATENT DOCUMENTS

| | | | | |
|---|---|---|---|---|
| 5,035,624 A | * | 7/1991 | Hosoya et al. | 434/309 |
| 5,952,597 A | * | 9/1999 | Weinstock et al. | 84/609 |
| 6,108,001 A | * | 8/2000 | Tuttle | 345/730 |
| 6,157,364 A | * | 12/2000 | Kohler | 345/855 |

OTHER PUBLICATIONS

Microsoft. PowerPoint 2000. Copyright 1987–1999.*
Microsoft. CD Player. Copyright 1981–1998.*

RealNetworks, Inc. RealPlayer Plus v5 Manual. 1997. [Retreived on Apr. 14, 2003]. Retrieved from the Internet<URL:http://web.archive.org/web/19991013042213/pluszone.real.com/manuals.html>.*

* cited by examiner

Primary Examiner—Ba Huynh
Assistant Examiner—Blaine Basom
(74) Attorney, Agent, or Firm—Roy W. Truelson

(57) ABSTRACT

A presentation assisting tool monitors the time remaining in a presentation in real time and dynamically adjusts the presentation to fit available time constraints. Preferably, the presentation tool is a software application program. A user generates and stores multiple frames of a presentation, assigning a numerical priority and a minimum, goal and maximum time to each frame. During the presentation to an audience, the tool monitors the progress of the presentation and the time remaining. The presentation tool dynamically adjusts goal times to fit the remaining time allotted, and if necessary, deletes entire frames using the pre-assigned priorities. The tool displays visible indicia of the time remaining, goal times, and/or need to move on to another frame, to the user. The visible indicia are preferably unintelligible to, or not easily noticed by, the audience. Such a presentation tool thus performs the mental gymnastics that were previously possible only for the most experienced and able speakers, enabling even novice speakers to improve their presentations, appearing more confident and professional.

19 Claims, 20 Drawing Sheets

COMPUTER ASSISTED PRESENTATION METHOD AND APPARATUS

FIELD OF THE INVENTION

The present invention relates to digital data processing devices, and in particular to computer application programs and devices for assisting a user making a presentation to third parties.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The declining prices and expanding capabilities of modern computers cause them to be applied to an ever increasing variety of applications. For some years now, inexpensive "personal computers" have been available for personal use at home or for the use of a single individual at a place of business. Although small, these machines provide capability that could have only been imagined not long ago.

One of the applications to which computers have been put is that of a presentation assisting device. In a typical use of this application, a human speaker (the user) makes a presentation to an audience. As part of the presentation, information from the computer is displayed to the audience, e.g., by display on one or more display terminals, or by projection onto a large screen using a special projector device. This information may be text phrases which emphasize certain points being made by the speaker, graphs, images, or other data. Except for very short presentations, the information being displayed is typically contained on multiple frames, which are shown to the audience in sequence as the speaker progresses through his presentation. Such frames may also be referred to as pages or slides, and are usually still frames, although not necessarily so. The speaker, or someone at his direction, will typically prepare the displayed information ahead of time, determining content and sequence of information to be displayed. The computer stores this information and displays it in the desired sequence.

Because the course of a speaker's presentation is not always predictable, conventional presentation assisting tools typically offer the speaker some control over the information displayed when in front of the audience. For example, existing tools permit the speaker to change the frame or page automatically at a preset time, or to change the time of his choosing, thus permitting the speaker to spend a long time on one page if the need arises, and to spend little time on other pages. Prior art tools also permit the speaker to vary the sequence of pages during the presentation, as by skipping a page where it appears unnecessary or the speaker is running out of time, or by going back to a previously displayed page to revisit some matter in response to a question from the audience.

As helpful as the existing presentation assisting tools are, they can still be difficult to use and impose substantial burdens on the speaker. One of the problems faced by speakers is the need to budget their time. Speakers are often required to adhere to a schedule which limits the total length of their presentations. At the same time, delays in getting started, equipment problems, questions from the audience, unforeseen interruptions, or just plain speaker inexperience may cause the speaker to lag significantly behind, and find himself in a position where he has used almost all of his time, but covered only half his material. Finishing significantly ahead of schedule, although less common, is also a problem, for it can create the impression that the speaker rushed through the material and the audience didn't get its money's worth.

An extremely experienced and adept speaker can make changes to his presentation on the fly to accommodate these circumstances, mentally keeping track of the time remaining and the relative importance of subjects yet to be covered while he addresses the audience, and abbreviating or deleting his discussion of less important matters in order to finish on time. Unfortunately, few speakers can measure up to this standard. Most speakers have difficulty speaking in front of an audience while simultaneously mentally adjusting the remaining presentation times and topics covered.

A need exists for improved presentation assisting tools which help speakers plan the timing of a presentation, keep advised of how well they are holding to the plan during presentation, and dynamically adjust their presentations to accommodate unforeseen circumstances. Furthermore, a typical speaker wants this capability without the audience being aware of what he is doing, so as not to draw attention away from the topic and to the mechanisms of the presentation. A typical speaker wants assistance in keeping time, but also wants to retain full control over the timing and sequence, to take extra time on a topic when needed.

SUMMARY OF THE INVENTION

A presentation assisting tool monitors the time remaining in a presentation in real time, provides status information to the speaker, and dynamically adjusts the presentation to fit the available time constraints or other constraints.

In the preferred embodiment, the presentation tool is an application program executing on a general purpose digital computer such as a well known "personal computer". A user prepares a presentation having multiple frames in advance, using an editing function of the presentation tool, and stores these on the computer. The user assigns a numerical priority level to each frame. The user further assigns a minimum time, a goal time, and a maximum time to be spent on each frame. During the presentation to an audience, the presentation tool monitors the progress of the presentation and the time remaining. The presentation tool dynamically adjusts goal times to fit the remaining time allotted, and if necessary, deletes entire frames using the pre-assigned priorities. The tool provides indicia of the time remaining, goal times, and/or need to move on to another frame, to the user.

In the preferred embodiment, the display presented to the audience is identical in content to the user's monitoring display, although typically much larger. The tool indicia of time remaining, goal times and so forth are preferably presented on the display in a form unlikely to be noticed or understood by the audience, and hence unlikely to cause unnecessary distraction. Specifically, indicia may be provided as non-textual coded information embedded in the frames of the presentation. Several variations of such indicia are possible. In one variation, font and color are altered. In another variation, icons can change. In still another variation, unannotated progress bars appear in various parts of the screen.

A presentation tool in accordance with the preferred embodiment of the present invention thus performs the mental gymnastics that were previously possible only for the most experienced and able speakers, and thus enables even novice speakers to improve their presentations, appearing more confident and professional. At the same time, the audience benefits from improved presentations which cover the essential subject matter, without the distractions of apparent speaker confusion or lack or organization.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
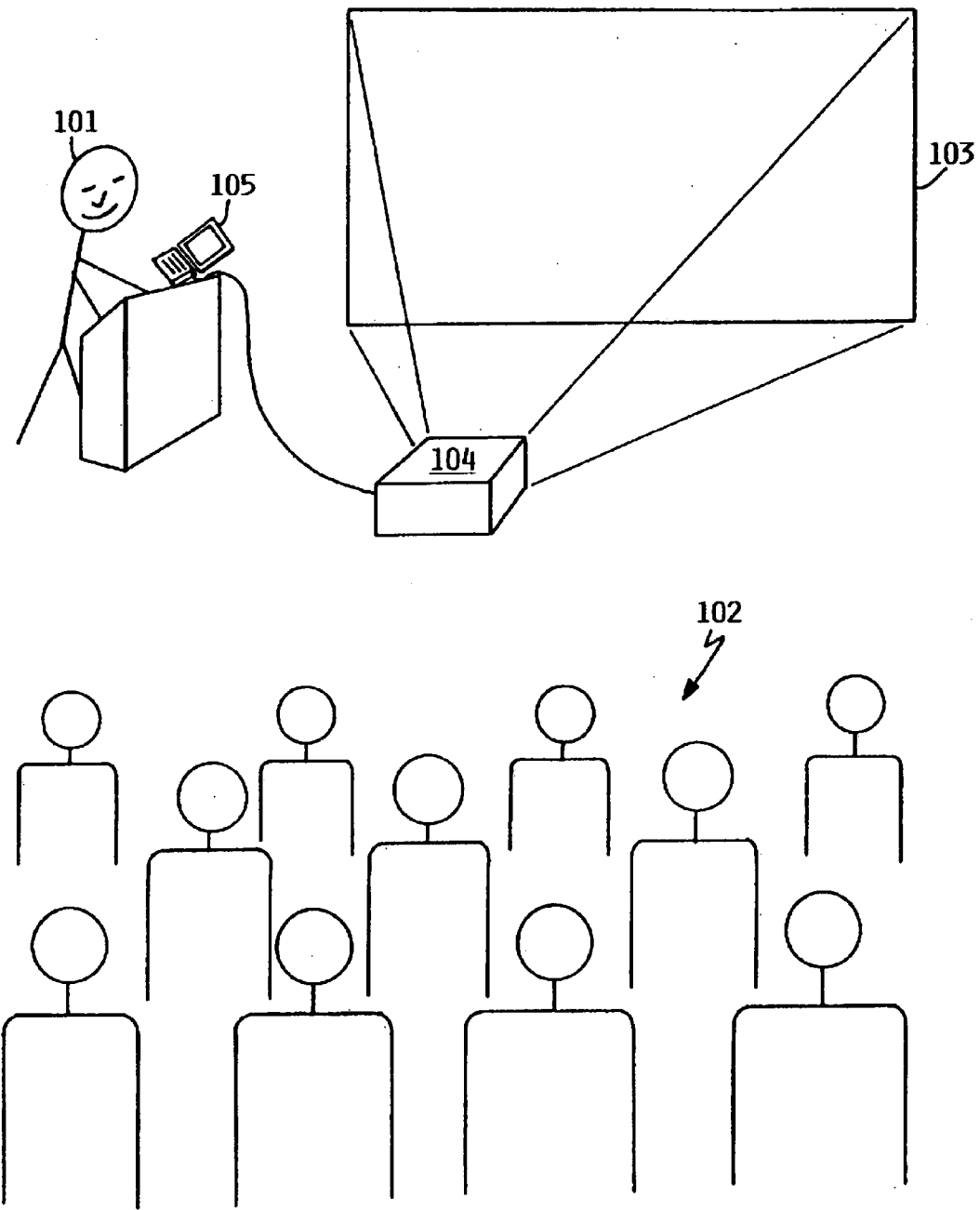
FIG. 1 illustrates a typical environment for using a presentation assisting device according the preferred embodiment of the present invention.

Referring to the Drawing, wherein like numbers denote like parts throughout the several views, FIG. 1 is an illustration of a typical speaker presentation to an audience, which shows an environment in which a presentation assisting device according to the preferred embodiment of the present invention might be employed. As shown in FIG. 1, a speaker 101 makes a presentation to an audience 102, often comprising a large number of persons. The speaker's words are accompanied by visual images which are displayed on display 103. In this illustration, display 103 is a white projection surface, upon which projector 104 projects an image. Projector 104 is coupled to a digital data processing device 105, which in this illustration is laptop computer system. Projector 104 projects on projection surface 103 an enlarged image of the display screen being displayed on computer system 105. Computer system 105 is preferably a small general purpose computer system, upon which is stored multiple frames which are displayed through projector 104 to the audience. Computer 105, which is under the control of speaker 101, executes a presentation assisting program during the speaker's presentation. The presentation assisting program causes frames to be retrieved from storage and displayed on the display of computer system 105 (and hence to the audience through projector 104). The presentation assisting program also monitors the time consumed by the speaker, and has the capability to automatically adjust the timing and content of the remaining portions of the presentation to fit the remaining time allotted, as more fully described herein.

Although a computer system 105 is illustrated in FIG. 1 as a laptop computer system, it will be understood that any of various digital data processing devices could be used. Device 105 could alternatively be a desktop computer system, a portable digital assistant (PDA) device, or a special purpose digital device intended solely for presentation assistance. Furthermore, the computing device may be located remotely from the speaker, and operated by another person, or by a remote control unit in possession of the speaker.

Although the display means illustrated in FIG. 1 is a projector which projects the contents of the computer screen on a projection surface, it will be understood by those skilled in the art that other display means may alternatively be used. For example, multiple cathode ray tube displays may be positioned in various locations around the room for viewing by the audience, each displaying the same image from the speaker's computer.

Figure 2:
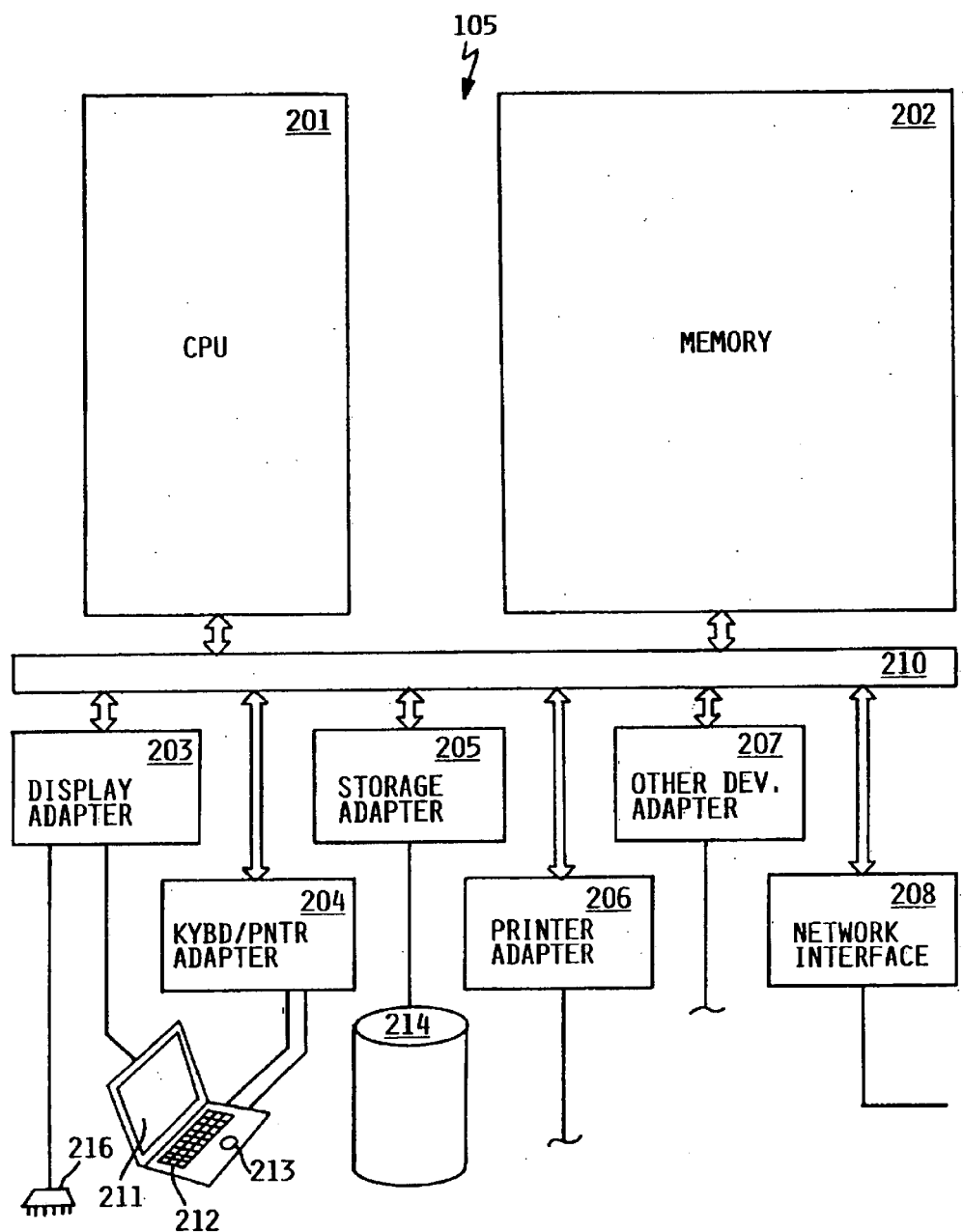
FIG. 2 is a high-level block diagram of a computer system for assisting a presentation to an audience, according to the preferred embodiment.

FIG. 2 is a high-level block diagram of a typical computer system 105, which may be used to assist a speaker in making a presentation to an audience, according to the preferred embodiment. Computer system 105 includes CPU 201, main memory 202, various device adapters and interfaces 203–208, and communications bus 210. CPU 201 is a general-purpose programmable processor, executing instructions stored in memory 202; while a single CPU is shown in FIG. 2, it should be understood that computer systems having multiple CPUs could be used. Memory 202 is a random-access semiconductor memory for storing data and programs; memory is shown conceptually as a single monolithic entity, it being understood that memory is often arranged in a hierarchy of caches and other memory devices. Communications bus 210 supports transfer of data, commands and other information between different devices; while shown in simplified form as a single bus, it may be structured as multiple buses, and may be arranged in a hierarchical form. Display adapter 203 supports video displays; in the preferred embodiment, display adapter supports internal display 211, which is a small flat-screen display built in to a laptop computer, and contains an external port 216 for driving an external display, both the internal and the external display being driven to display identical data. Keyboard/pointer adapter 204 supports keyboard 212 and pointing device 213, depicted as a built-in trackball, it being understood that other forms of input devices could be used. The display 211, keyboard 212 and pointing device 213 are shown "outside" the other components of system 205 for illustrative purposes, it being understood that in fact the other components would typically be housed within the laptop computer system. Storage adapter 205 supports one or more data storage devices 214, which are typically rotating magnetic hard disk drives, although other data storage devices could be used. Printer adapter 206 supports communication with an optional printer (not shown). Other device adapter 207 is a generic representation of adapters for other types of devices. Network interface 208 provides a physical interface to a computer network, such as the Internet, or a local area network, and might be implemented, e.g., as a modem for communicating through a telephone line to an Internet service provider. System 105 might alternatively be connected to a larger "mainframe" computer system through a mainframe terminal channel interface.

The representation of FIG. 2 is intended as an exemplary simplified representation, it being understood that many variations in system configuration are possible in addition to those mentioned here. The number and type of attached devices may vary considerably. Computer system 105 will typically be any of various models of single-user computer systems known as "personal computers"; however, the methods and apparatus described herein for assisting a speaker's presentation could be implemented in different environments, and functions could be distributed among different computer systems or system components. For example, an interactive workstation could be attached to a mainframe computer system, the mainframe storing data including images for presentation, and the workstation being used to control the presentation. Alternatively, the present invention could be implemented using a client-server model in which servers store data or perform certain tasks on behalf of requesting clients.

Figure 3:
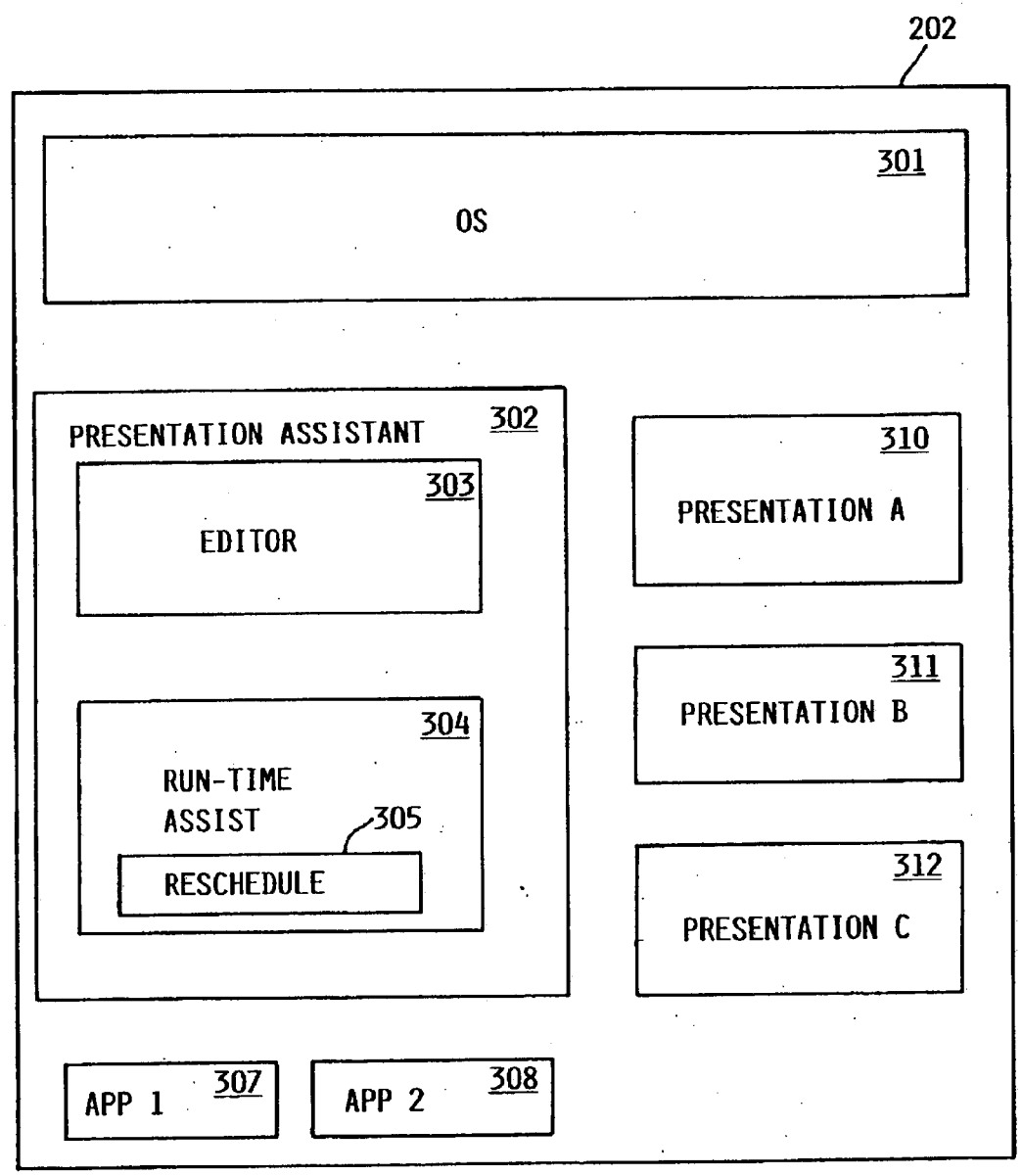
FIG. 3 is a conceptual illustration of the major software components of the computer system, according to the preferred embodiment.

FIG. 3 is a conceptual illustration of the major software components of computer system 105 in memory 202. Operating system 301 provides various low-level software functions, such as device interfaces, management of memory pages, management of windowing interfaces, management of multiple tasks, etc. as is well-known in the art. Presentation assistant 302 is an application program which assists a speaker in making a presentation to an audience. Presentation assistant 302 has two major functions: an editor function 303, and a run-time assistance function 304, as further described below. Memory 202 may further contain one or more stored presentations 310–312. Each stored presentation contains a plurality of images intended to be shown in a defined sequence during a speaker's presentation to an audience. Usually, these are still images, but images may be animated or moving video sequences, and moving images may be interspersed with still images. Each component of a stored presentation will herein be referred to as a "frame", whether it is a single still page or slide, or a moving segment such as a video clip. Memory 202 may contain various additional applications for performing useful work, which are shown generically in FIG. 3 as applications 307–308. These applications may include, e.g., word processing, spreadsheet, electronic calendar, accounting, graphics, computer code development, or any of thousands of other possible applications.

While a certain number of applications, files or other entities are shown in FIG. 3, it will be understood that these are shown for purposes of illustration only, and that the actual number and type of such entities may vary. Additionally, while the software components of FIG. 3 are shown conceptually as residing in memory, it will be understood that in general the memory of a computer system will be too small to hold all programs and data simultaneously, and that information is typically stored in data storage 214, comprising one or more mass storage devices such as rotating magnetic disk drives, and that the information is paged into memory by the operating system as required.

Editor function 303 provides the user with the capability to create, edit and save frames to be displayed to the audience during the speaker's presentation. Such frames could be text images, graphs and charts, drawings, photographs, video, etc., or combinations thereof. Frames may be created from scratch (as would be typical of text), may be downloaded from another computer system, may be scanned into system 105 using a scanner (not shown), or generated by other means. Means for generating, editing and storing such presentation frames are well known in the art, and will not be further described herein. Editor 303 may use any or all of various conventional means for creating, editing and storing frames. In the preferred embodiment, editor 303 further has the capability to receive user input associating three time intervals with each respective frame, designated herein as the minimum time, the goal time and the maximum time, and to store this information in the presentation files 310–312. The minimum time represents the minimum amount of time required by the speaker to cover a particular frame during the presentation to the audience. The goal time represents an optimum time for covering the frame, while the maximum time represents the maximum amount of time the speaker should devote to a particular frame. These times may be identical, e.g., in the case of a short video clip, where the speaker typically would not interrupt the clip and allow it to be shown in its entirety.

Run-time assist function 304 displays images from a previously generated and stored presentation 310–312 during an actual or simulated presentation to an audience. Specifically, run-time assist function 304 is an interactive application function, which displays images, and receives input from the speaker to proceed to the next image. Run-time assist further monitors the time spent during the presentation. Among the features of run-time assist is rescheduling function 305, which provides the capability to dynamically adjust the goal times associated with frames during the presentation, as further described herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 2 as storage device 214 and memory 202.

Figure 4A:
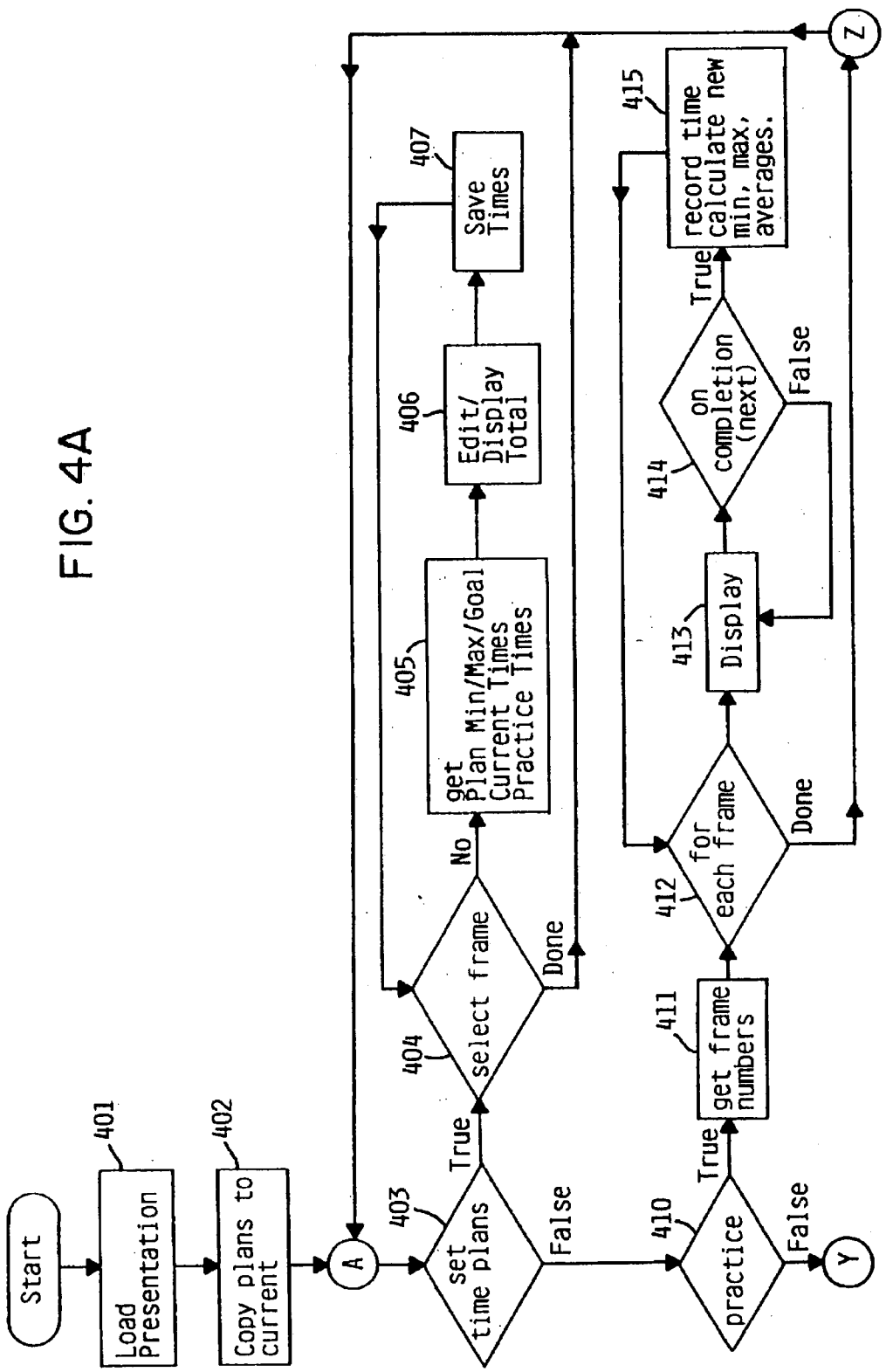
FIG. 4 is a high-level flow diagram of the operation of a run-time assist function of a presentation assist application, according to the preferred embodiment.
Figure 4B:
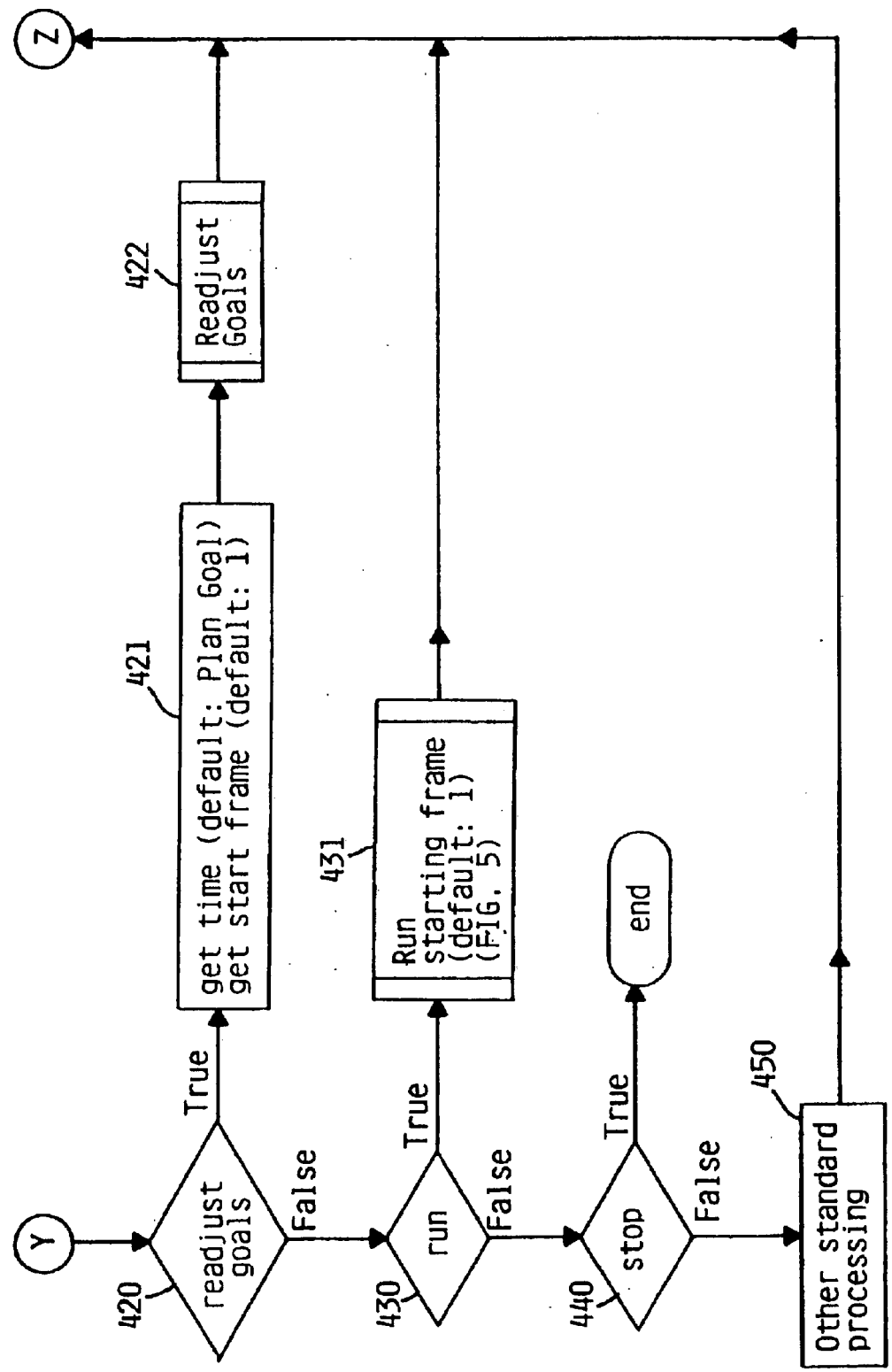
Figure 7:
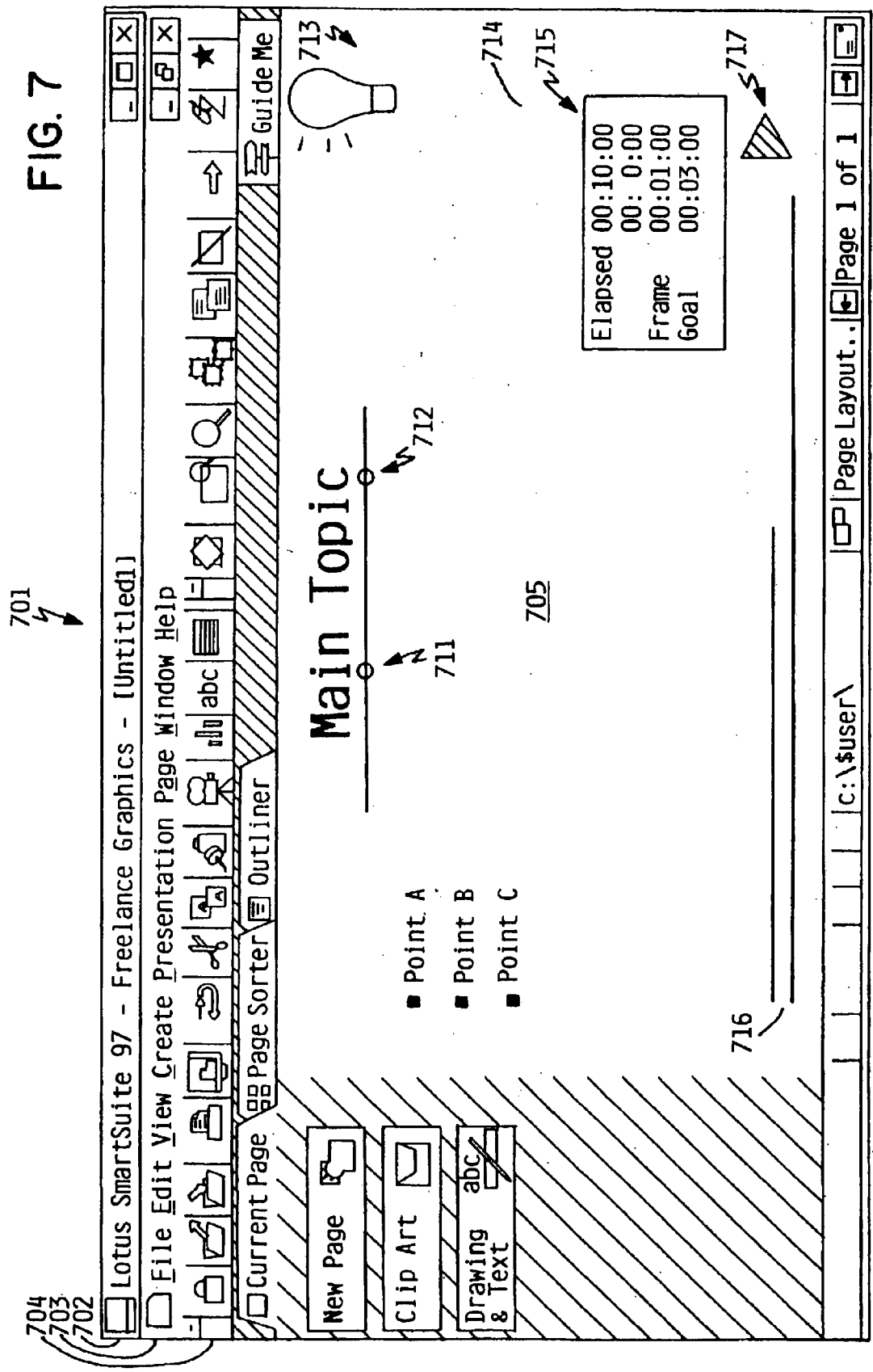
FIG. 7 illustrates a typical interactive window of a presentation assisting application during a presentation, showing examples of different progress indicators, according to the preferred embodiment.

FIG. 4 is a high-level flow diagram of the operation of run-time assist function 304, according to the preferred embodiment. Run-time function 304 is preferably an interactive application program which presents a user with a multiple choices and allows the user to select various functions for controlling a presentation. In the preferred embodiment, the run time function executes in a window using a well-known multiple windowed operating system such as Microsoft Windows. At the periphery of the window are various control functions for the window itself and for the application. In the center of the window, consuming most of the area of the window, is displayed a single frame of the presentation. An example executing window is shown in FIG. 7 and explained in greater detail below. As is standard in such a user interface, the various available functions of the application may be selected from a tool bar, menu bar, buttons, list of choices, or the like, by clicking on an appropriate choice with an interactive pointing device, such as a mouse. However, the exact manner of making the choice could vary.

As a preliminary matter, the presentation assist application maintains three sets of times for the various frames, which may or may not be the same, each set comprising a minimum time, a goal (or average) time, and a maximum time. The "plan" times refers to the set of times stored with the presentation on a more or less permanent basis. While the user may edit these times, they are not automatically changed as a result of a single presentation or practice run. The "current" times refers to the set of times in current use; these times are initialized to the plan time values when a presentation is loaded from storage, but they may be dynamically changed during the presentation. The "practice" times refer to statistical minimum, maximum and average values as a result of actual practice runs.

As shown in FIG. 4, upon being invoked by a user, run-time function 304 loads a previously generated and stored presentation file selected by the user (step 401). Run-time function then initializes certain variables, and in particular, it initializes its set of current time variables from the stored plan times in the selected presentation file (step 402). These times are the minimum, goal and maximum times for each respective frame in the selected presentation.

After loading and initialization, the run-time function allows the user to choose any of various sub-functions with respect to the selected presentation file. The major sub-functions supported and depicted in FIG. 4 are a set time plans function, a practice function, a readjust goals function, and a run (or present) function. However, it will be understood that in addition to these sub-functions, the presentation assist application could support any of various conventional functions and sub-functions, which are not essential to an understanding of the present invention and are not further explained herein. As just one example of such an additional function, the application could support the printing of various frames to a printer.

The set time plans function allows the user (e.g., speaker) to change the minimum, maximum or goal times for any arbitrary frame. If the user selects this function ("T" branch from step 403, where "T"=true, "F"=false), the application prompts the user to select a frame at step 404. If a frame is selected, the plan minimum time, maximum time and goal time and the current minimum, maximum and goal times for the frame are retrieved and displayed (step 405). Also displayed are the actual minimum, maximum and average times, if any, recorded for this frame during any practice runs taken using the practice function (described below). The user may then change any or all of the plan times and/or current times; the new times are displayed along with the new total minimum, maximum and goal plan and current times for the entire presentation (step 406). Any updated plan times are then saved (step 407). The function then returns to step 404, allowing the user to select another frame for altering the times, or to exit the set time plans function (the "Done" branch from step 404).

The practice function allows the user to practice making a presentation from start to finish, or for any particular frame, and collects statistics which may be used to obtain new plan times. I.e., a speaker may practice giving a presentation any number of times using the practice function. For each practice run, the application records the time required for each individual frame. By taking several practice runs, one can compute an average (which may translate to a "goal" time), maximum and minimum times. The speaker may deliberately make one "hurried" practice run to establish minimum times for each frame, and a second "stretched out" practice run to establish maximum times for each frame.

If the user selects the practice function ("T" branch from step 410), the user first selects frame numbers to practice (step 411). The user may select all frames, may select a range of frames, or may select individual frames. This selection may be performed using any of various conventional means of input. The application then processes each selected frame in sequence (step 412). For each selected frame, the frame is displayed (step 413), and the application waits at step 414 for the user to indicate that it is time to go on to the next frame. When the user indicates that the application should continue (as by selecting a "next" button with a pointing device, the "T" branch from step 414), the application records the time required for the current frame and calculates new minimum, maximum and average times from practice runs, and then returns to step 412. These averages may be helpful in setting plan times, as described above. When all selected frames have been run through the practice, the "Done" branch is taken from step 412 and the application exits the practice function.

The readjust goals function is invoked to let the application automatically change the current goal times, minimum times and/or maximum times. The capability to automatically adjust the current times can be invoked either during an actual presentation, or as a stand-alone function, as depicted by the "T" branch from step 420. Typically, it would be invoked as a stand-alone function in the situation where a speaker learns shortly before beginning that the schedule has changed. E.g., the previous speaker might have run late, leaving less time to complete the presentation. When readjust goals is invoked as a stand-alone function, the user enters a total time allowed for completion and a starting frame, which is usually the first frame (step 421). The readjust goals procedure is then called, passing the total time allowed and starting frame as parameters (step 422). This procedure is described in greater detail below and shown in FIG. 6.

The run function is used for an actual presentation to an audience. Frames are sequentially displayed and changed on cue from the speaker, while the application monitors the time in each frame and total time remaining. The selection of the run function is shown as the "T" branch from step 430.

When the run function is called, the user indicates a starting frame, which is usually the first frame. The run function is depicted in FIG. 4 as step 431, and is shown in greater detail in FIG. 5, discussed below.

The speaker may choose to exit the application, which is shown in FIG. 4 as the "T" branch from step 440. The speaker may also choose any of various additional conventional functions, as explained above, and depicted in FIG. 4 as step 450.

Figure 5A:
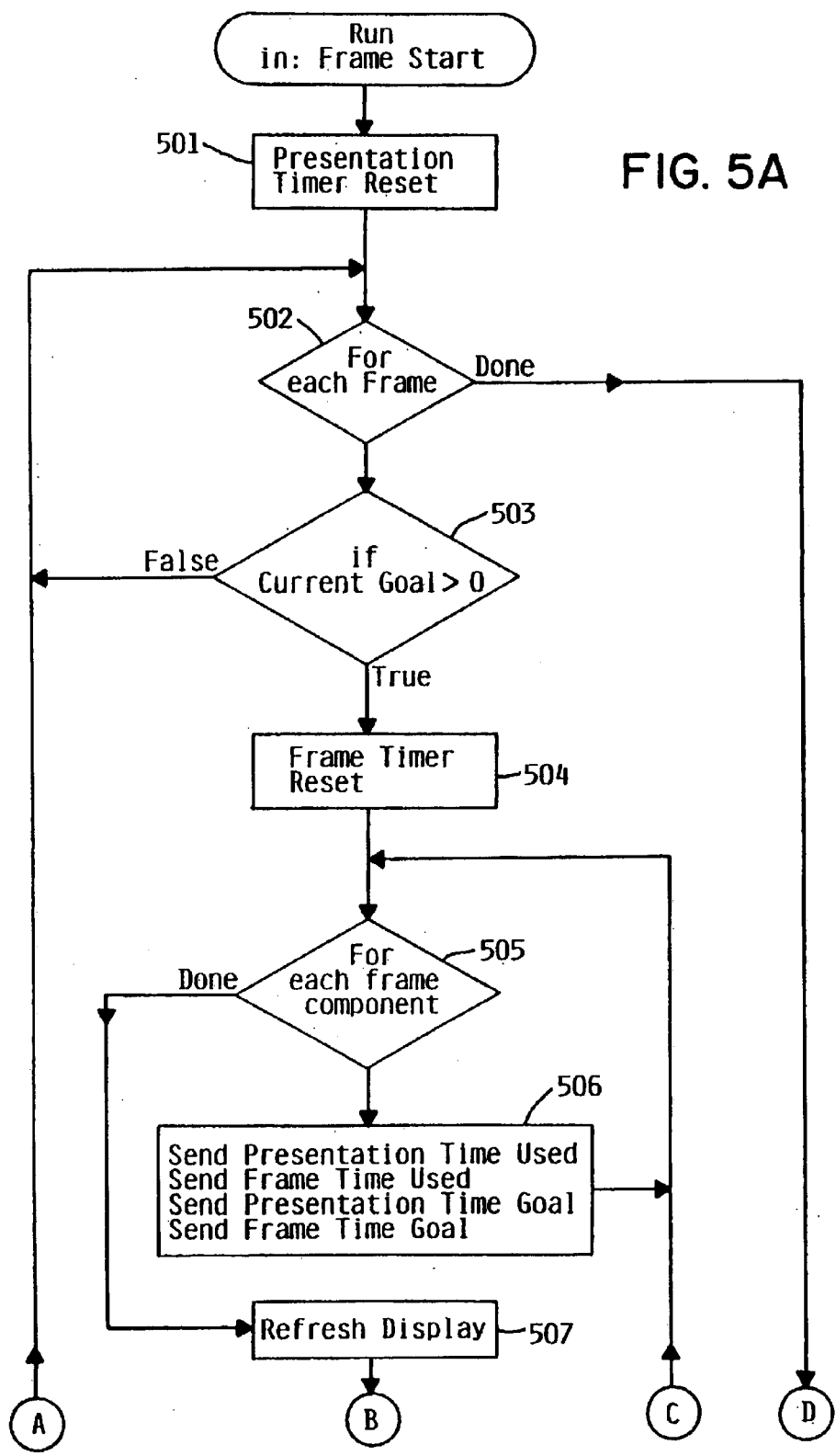
FIG. 5 illustrates in greater detail the steps performed by the run function, which is used when actually presenting to an audience, according to the preferred embodiment.
Figure 5B:
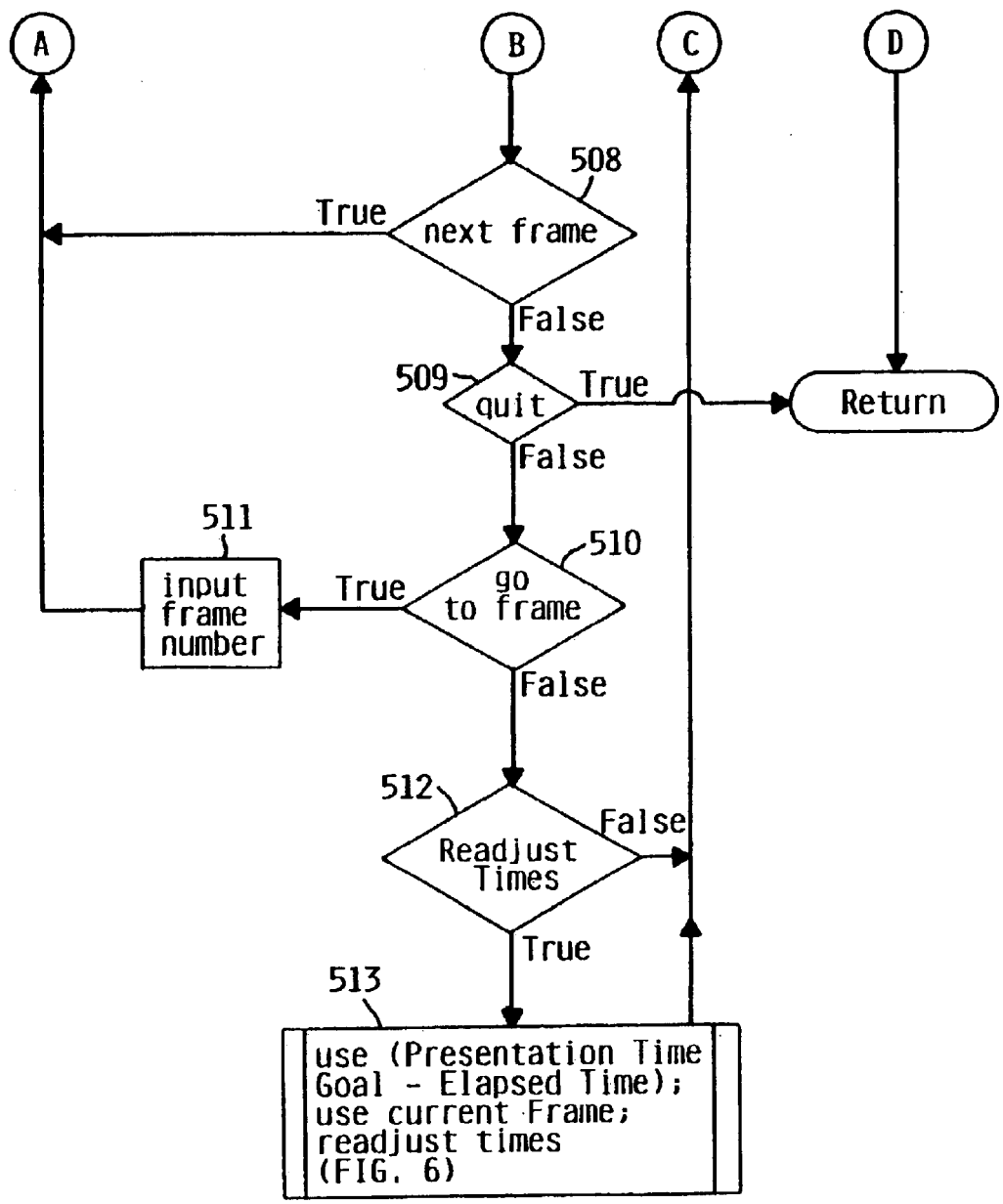

FIG. 5 illustrates in greater detail the steps performed by the run function. When called, the run function initially resets a presentation timer which is used to track the total time elapsed during the presentation (step 501). Each frame in the presentation is then processed until no more frames remain (step 502), performing the following steps. If the current goal time of a frame being processed is 0 (the "F" branch from step 503), the frame is skipped and the next frame is selected. If the goal is greater than 0, a frame timer for the frame being processed is reset (step 504). Each component of the frame is then processed for display until all components have been processed (step 505). Some of these components will be fixed images on the display which do not vary; other components are used to inform the speaker of his progress and the time available, and these components vary depending on the amount of time used in relation to the goal times, as described in greater detail below. At step 506, the current presentation time used, frame time used, and total presentation goal and frame goal times are passed as parameters to a procedure which processes the corresponding component of the frame. When all components of the frame are processed, the "Done" branch from step 505 is taken and the image of the frame on the display is refreshed (step 507). The speaker may perform any of several actions. He may select the next frame, as indicated by the "T" branch from step 508. He may exit the presentation, as indicated by the "T" branch from step 509. He may skip or go back to any arbitrary frame number, as indicated by the "T" branch from step 510, followed by the step of selecting an arbitrary frame (step 511). Finally, the speaker may elect to readjust the goal times, as indicated by the "T" branch from step 512. If the user makes no selection, (the "F" branch from step 512), the application continues to reprocess all the display components and refresh the display.

As shown in FIG. 5, the option to readjust the goal times must be selected by the user, although once selected, the application will automatically compute all the times and change the current goals accordingly. While it would alternatively be possible for the readjustment algorithm to be triggered automatically (e.g., if the speaker is behind or ahead of his goals by more than a pre-defined threshold), it is believed that such automatic triggering may confuse the speaker, and it is therefore best to readjust goal times only at the request of the speaker. Upon selecting this option, the readjust goals procedure is called, passing as parameters the remaining time in the presentation, and the current frame number. This is represented as step 513 in FIG. 5, and is shown in greater detail in FIG. 6.

Figure 6A:
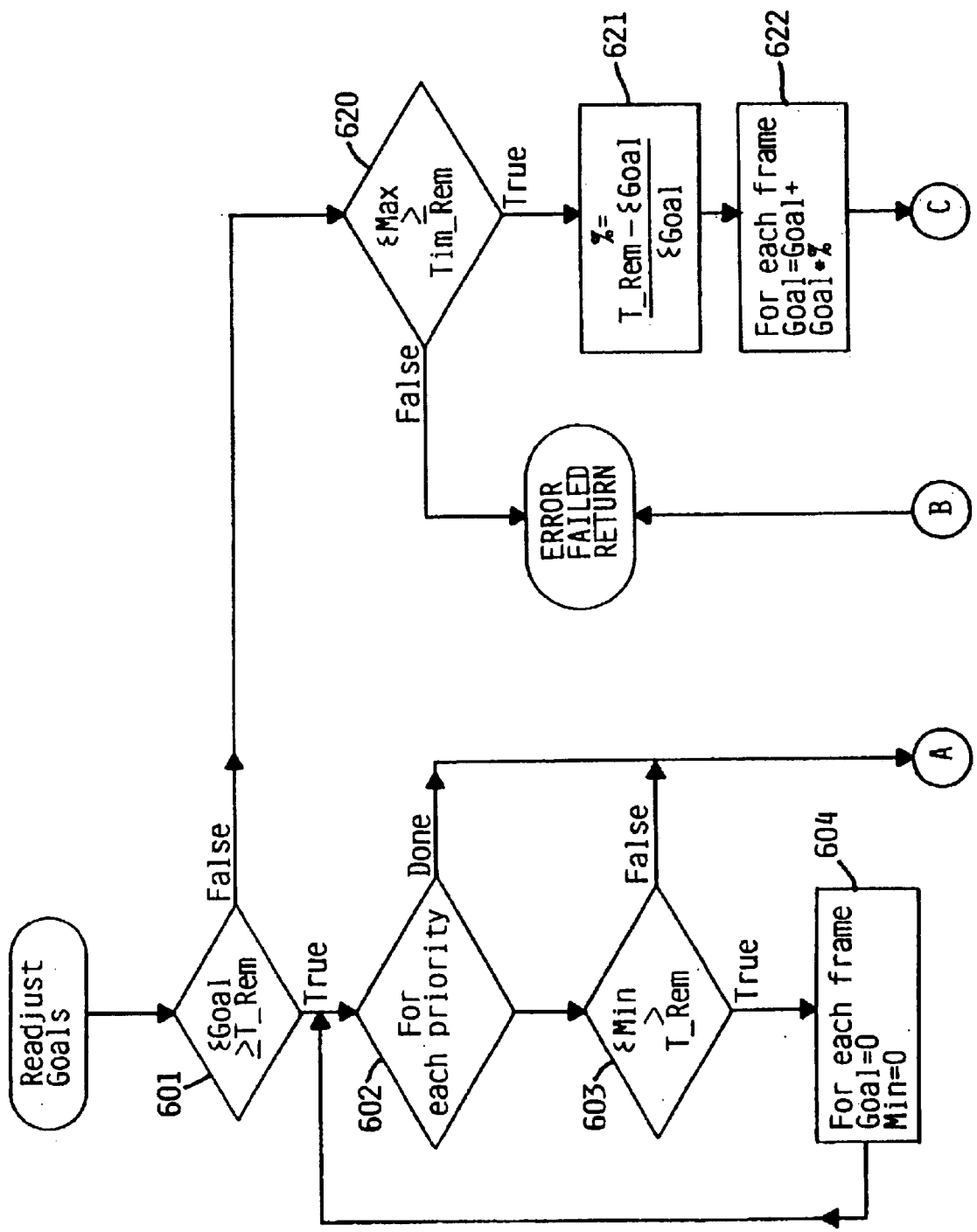
FIG. 6 illustrates in greater detail the steps performed to automatically readjust the goal times of frames to be presented, according to the preferred embodiment.
Figure 6B:
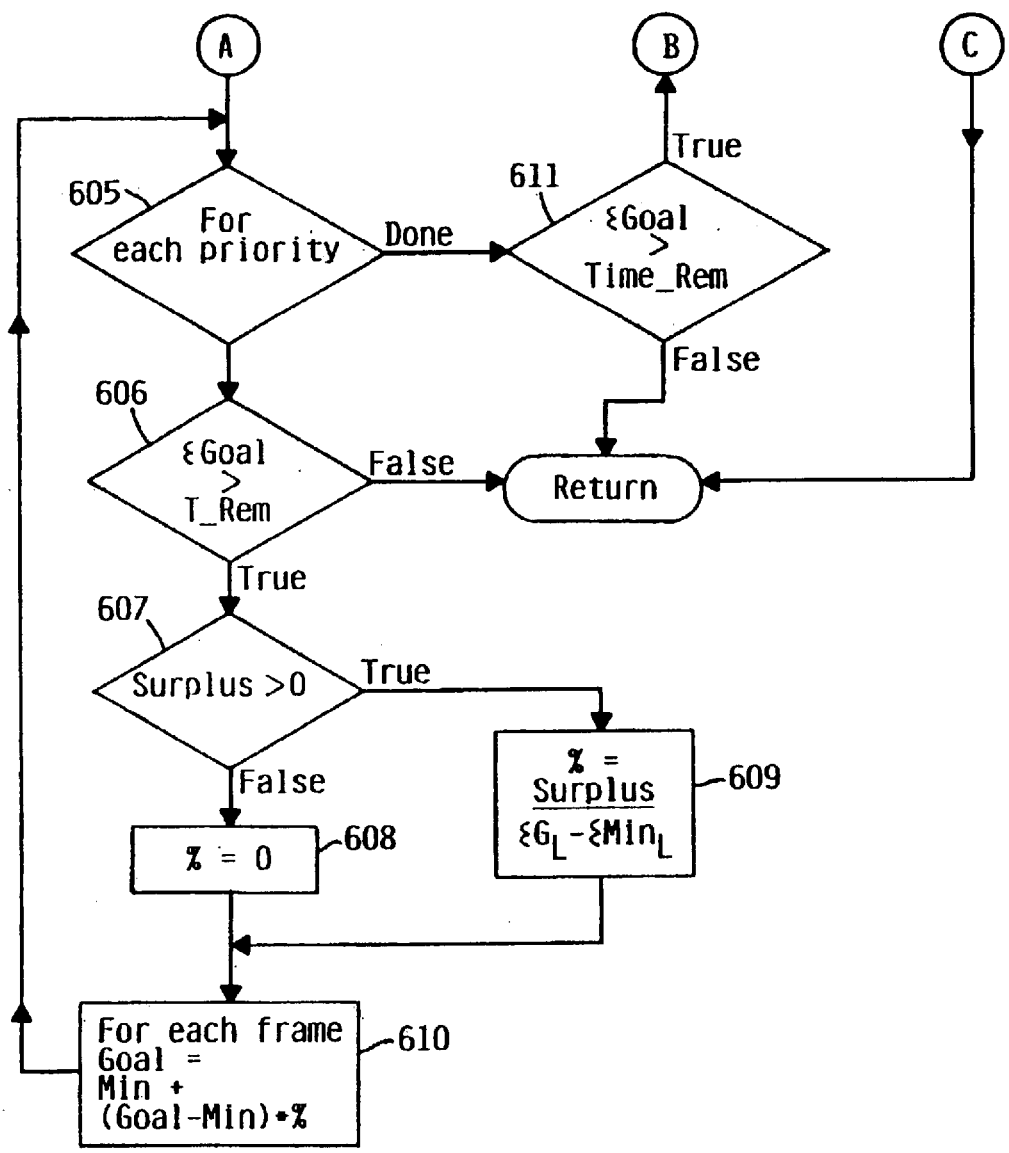

Referring to FIG. 6, the readjust goals procedure takes at least two passed parameters, one being the time remaining (T_Rem) in the presentation, the other being the current frame. If the readjust goals procedure is called from the run function (i.e., from block 513), the time remaining is computed automatically from the presentation timer and the total time available; if the readjust goals procedure is called as a stand alone function (i.e., from block 422), the user inputs time remaining.

The readjust goals procedure is capable of adjusting goals either upward or downward, but it is expected that in most instances it will be necessary to adjust downward, i.e., to compress goal times because the speaker is running behind, rather than the reverse. The strategies used in the two cases are slightly different. At step 601, the procedure takes the summation of the current goal times of all remaining frames ($\Sigma$Goal) and compares this to the time remaining (T_Rem). If $\Sigma$Goal$\geq$T_Rem, then the compression strategy is followed, as indicated by the "T" branch from step 601; otherwise the expansion strategy is followed, as shown by the "F" branch from step 601.

When following the compression strategy, the readjust goals procedure first determines whether the speaker is so far behind that it is necessary to delete some frames from the presentation. Each frame is assigned a priority level, which is simply an integer, it being possible for multiple frames to have the same priority. For each priority level starting with the lowest priority level, and excepting the highest priority level (step 602), the procedure computes the summation of the current minimum times of all remaining frames ($\Sigma$Min), and compares this with T_Rem (step 603). If $\Sigma$Min>T_Rem, then it is necessary to delete some frames. In this case, the current goal and current minimum times of each remaining frame at the priority level being considered are set to 0 (step 604), effectively deleting these frames from the remaining presentation. The procedure then increments the priority level and repeats this process. Once $\Sigma$Min$\leq$T_Rem, it is no longer necessary to delete additional frames, and the "F" branch from step 603 is taken. If the highest priority level is reached before taking the "F" branch from step 603, the "Done" branch is taken from step 602. In either case, deletion of frames is complete, and step 605 is executed next.

After deleting frames as explained above, the readjust goal procedure again begins at the lowest priority level and considers each priority level in turn (step 605). If the summation of the current goal times of all remaining frames ($\Sigma$Goal) is greater than T_Rem, then it is necessary to further reduce goal times, and the "T" branch from step 606 is taken. The procedure then computes the "Surplus" time at step 607, which is defined as:

$$\text{Surplus} = \text{T\_Rem} - \Sigma\text{Goal}(\neg P) - \Sigma\text{Min}(P) \quad (1)$$

where $\Sigma$Goal($\neg$P) is the summation of the current goal times for all remaining frames having a priority other than P, the priority level now under consideration, and $\Sigma$Min(P) is the summation of the current minimum times for all remaining frames having a priority of P. The "Surplus" represents the available remaining time which can be pro-rated among the frames at priority level P. If the "Surplus" is less than or equal to 0, the "F" branch is taken from step 607. In this case, there is no surplus time to be pro-rated at level P, and the proration percentage is set to 0 (step 608). If the Surplus is greater than 0, the "T" branch is taken from step 607, and the proration percentage is computed at step 609 as:

$$\text{Proration\_pct} = \frac{\text{Surplus}}{\Sigma\text{ Goal}(P) - \Sigma\text{ Min}(P)} \quad (2)$$

where $\Sigma$Goal(P) is the summation of the current goal times for all remaining frames at priority level P. It will be observed that this computation is only performed after taking the "T" branch from step 606 and the "T" branch from step 607. Simple algebraic manipulation can demonstrate that this is only possible when $\Sigma$Goal(P)>$\Sigma$Min(P), and therefore the denominator in equation (2) can never be zero. For each remaining frame at priority level P, the current goal is then readjusted at step 610 as follows:

$$\text{New\_Goal} = \text{Min} + (\text{Old\_Goal} - \text{Min}) * \text{Proration\_pct} \quad (3)$$

where New_Goal is the current goal time for the frame after readjustment, Min is the current minimum time for the frame, and Old_Goal is the current goal time for the frame before readjustment. The procedure then proceeds to step 605 to consider the next priority level.

The compression readjustment ends either when all priority levels have been considered (the "Done" branch from step 605), or when the summation of goal times of remaining frames is no longer greater than the time remaining, causing the "F" branch from step 606 to be taken. In the former case, the procedure tests whether the summation of goal times are still greater than the time remaining (step 611); if so, the procedure returns with an error indication (i.e., it was unable to squeeze the goal times sufficiently to fit the presentation into the available time). Otherwise, the procedure returns normally.

If the "F" branch is taken from step 601, an expansion strategy is followed. The expansion strategy differs from the compression strategy in that the extra time available is prorated among all remaining frames, without regard to priority level. The reason for this difference in strategy is that, in the case of compression (i.e., not enough time), the available time should naturally be spent on the more important topics. But if there is too much time, it is not necessarily true that the more important topics should receive it. It may be just as easy to stretch out a presentation on less important topics.

In the case of expansion, the readjust procedure compares the summation of current maximum times for the remaining frames (ΣMax) with T_Rem (step 620). If T_Rem is greater than ΣMax, then it is not possible to expand the remaining frames to occupy the time available, and the "F" branch is taken from step 620, resulting in a return with an error indication. If ΣMax is greater than or equal to T_Rem, then a proration percentage is computed at step 621 as follows:

$$\text{Proration\_pct} = \frac{\text{T\_Rem} - \sum \text{Goal}}{\sum \text{Max} - \sum \text{Goal}} \quad (4)$$

where ΣGoal is the summation of the current goal times for all remaining frames. As in the case of equation (2), it can be shown algebraically that step 621 is only executed when ΣMax>ΣGoal, and therefore the denominator in equation (4) is never zero. The current goal time of each remaining frame is then computed as follows at step 622:

$$\text{New\_Goal} = \text{Old\_Goal} + (\text{Max} - \text{Old\_Goal}) * \text{Proration\_pct} \quad (5)$$

where New_Goal is the current goal time for the frame after readjustment, Max is the current maximum time for the frame, and Old_Goal is the current goal time for the frame before readjustment. The procedure then returns.

In the calculations explained above with respect to FIG. 6, it was assumed for purposes of clarity of explanation that all remaining frames in the presentation had not yet been shown. In fact, since a speaker may invoke the readjust goals procedure at any arbitrary time in the presentation, it is possible that he will already have spent some time on the current frame, which makes the computations a little more involved. Where appropriate, if minimum, maximum and goal times are used in the calculations, the time already spent on the current frame is subtracted from the prospective minimum, maximum and goal times. For example, in step 601, the summation of goal times of all remaining frames is actually the summation of such goal times, adjusted by subtracting the time already spent in the current frame (unless such time is already more than the goal time for the current frame, in which case only the goal time of the current frame is subtracted). Similar adjustments are made to the summation of minimum times in step 603, the summation of goal times in step 606, the summation of goal times and minimum times used for computing "surplus" time and percentages in steps 607 and 609, the summation of maximum times in step 620, and the summation of goal times in step 621. In step 610, the goal time for the current frame is as given by the formula, less the time already spent on the current frame, and a similar adjustment is made in step 622. These adjustments could be extended to any arbitrary number of frames if the speaker were jumping around in the presentation.

As described above with respect to step 506, components of each frame are periodically updated and refreshed. In the preferred embodiment, some of the components are designed to convey information to the speaker regarding the progress of the presentation, such as indicators that it is time to move to the next frame, or indicators of total time used. Since these indicators are actually shown on the frame itself (and therefore visible to the audience, they are preferably as unobtrusive as possible, to avoid distracting the audience. Preferably, the presentation assistant can be configured to use any or all of these indicators.

FIG. 7 illustrates a sample presentation window from an executing presentation assist application. As shown in FIG. 7, window 701 comprises conventional title bar 702, menu bar 703, function buttons 704, and so forth, which are generally located at the periphery of the window. The central portion of window 701 displays a single frame 705 of the presentation. Within the frame are various types of indicators which might be displayed in different components of the frame. The type of indicators shown in FIG. 7 are: status sensitive text 711, status sensitive disguised histograms 712, status sensitive animation 713, status sensitive background 714, status sensitive digital display 715, status sensitive histograms 716, and status sensitive reminder icon 717. Typically, a speaker would select only one or some of these indicators, rather than all of them.

Figure 8:
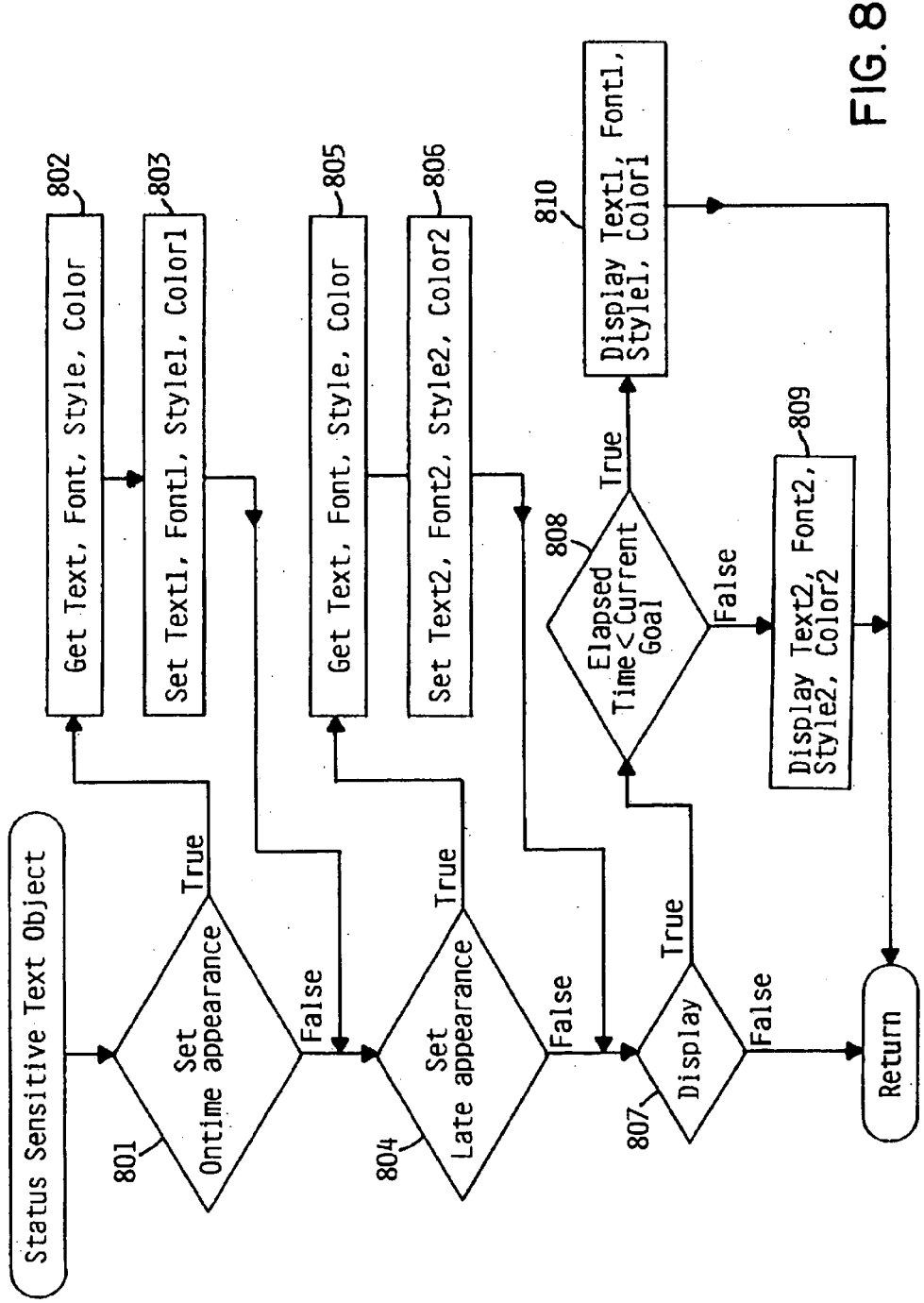
FIG. 8 illustrates the steps for processing a status sensitive text object, according to the preferred embodiment.

Status sensitive text 711 is text within the presentation which changes its font, style (ie. bold, italic, etc.) and/or color as an indication of the speaker's progress. In the example of FIG. 7, the text "Main Topic" is status sensitive text. FIG. 8 illustrates a procedure for processing a status sensitive text object. In this simple example, the status sensitive text has only two possible appearances, one for the normal case, and a second when the speaker is running late in the current frame (i.e, has exceeded the goal time for the current frame). However, it will be appreciated that many different combinations of color, font and style could be used to convey more complex information. For example, color could change shade gradually as the speaker uses more and more time, or font, style and color changes could be used to show the progress against total goal time of all frames.

As shown in FIG. 8, if on-time appearance is to be set (step 801), the application retrieves the object's text, font style and color (step 802), and sets on-time appearance attributes to Text1, Font1, Style1 and Color1 corresponding to on-time performance (step 803). Setting attributes may be accomplished with any of various conventional editing tools. If late appearance is to be set (step 804), the application retrieves the object's text, font, style and color (step 805), and sets late appearance attributes to Text2, Font2, Style2, and Color2 corresponding to late performance (step 806). If the application is running in display mode (e.g., the run function) (step 807), the application compares the elapsed time in this frame with the current goal time for the frame (step 808), and displays the first set of attributes if elapsed time is less than the current goal (step 810), and the second set of attributes if it is greater than the current goal (step 809).

Figure 9A:
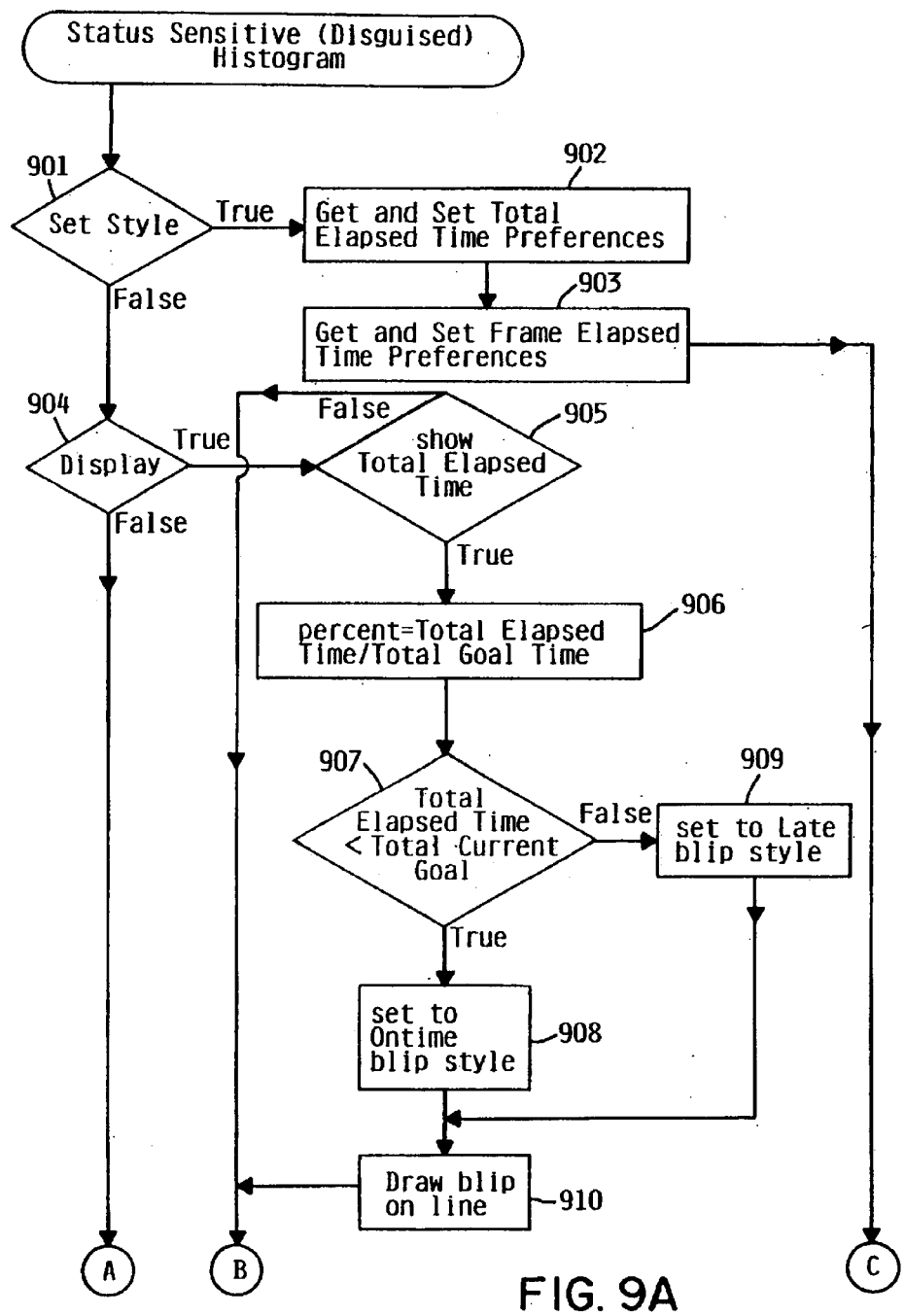
FIG. 9 illustrates the steps for processing a status sensitive histogram object, according to the preferred embodiment.
Figure 9B:
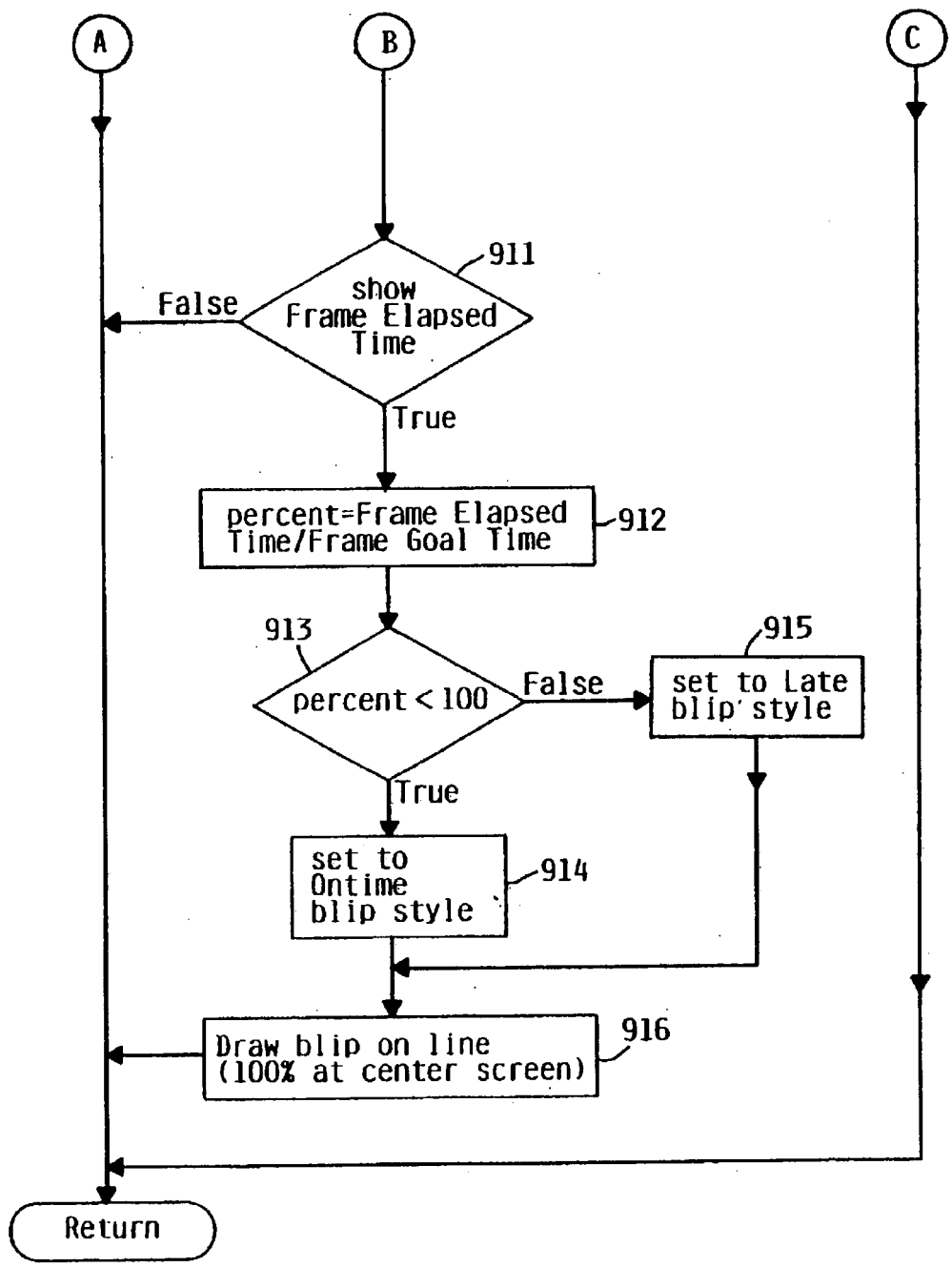

A status sensitive disguised histogram is a histogram which is incorporated into a graphic within the frame of the presentation. In the example of FIG. 7, the horizontal line under "Main Topic" is a disguised histogram. The line appears to be separating "Main Topic" text from "Point A", etc. text, but also functions as a histogram. The horizontal line represents total time allotted for the presentation, and two small icons (shown as circles in FIG. 7) on the line represent the percent of total time used, and the percent of time used for the current frame. These icons change appearance and/or position when the speaker is past the total goal time or goal time for the current frame. FIG. 9 illustrates a procedure for processing a status sensitive disguised histogram object.

As shown in FIG. 9, if histogram style is to be set (step 901), the application retrieves and sets the attributes for total elapsed time (e.g., whether total elapsed time will be shown, the type of icon to be used, size, color etc.) (step 902), and sets the attributes for frame elapsed time (step 903). If the application is running in display mode (step 904), the application determines whether total elapsed time is to be shown (step 905). If so, the application computes total elapsed time as a percentage of total goal time (step 906) and determines whether the total elapsed time is less than total goal time (step 907). If total elapsed time is less than total goal time, the icon is set to its on-time style (step 908); otherwise it is set to its late style (step 909). The icon is then located on the horizontal line at a location corresponding to the percentage computed in step 906 (step 910). If elapsed time in the current frame is to be shown (step 911), the application computes frame elapsed time as a percentage of current goal time for the frame (step 912). If the percent is less than 100% (step 913), the icon is set to its on-time style (step 914); otherwise it is set to its late style (step 915). The icon is the located on the horizontal line at a location corresponding to the percentage computed in step 912 (step 916).

Figure 10A:
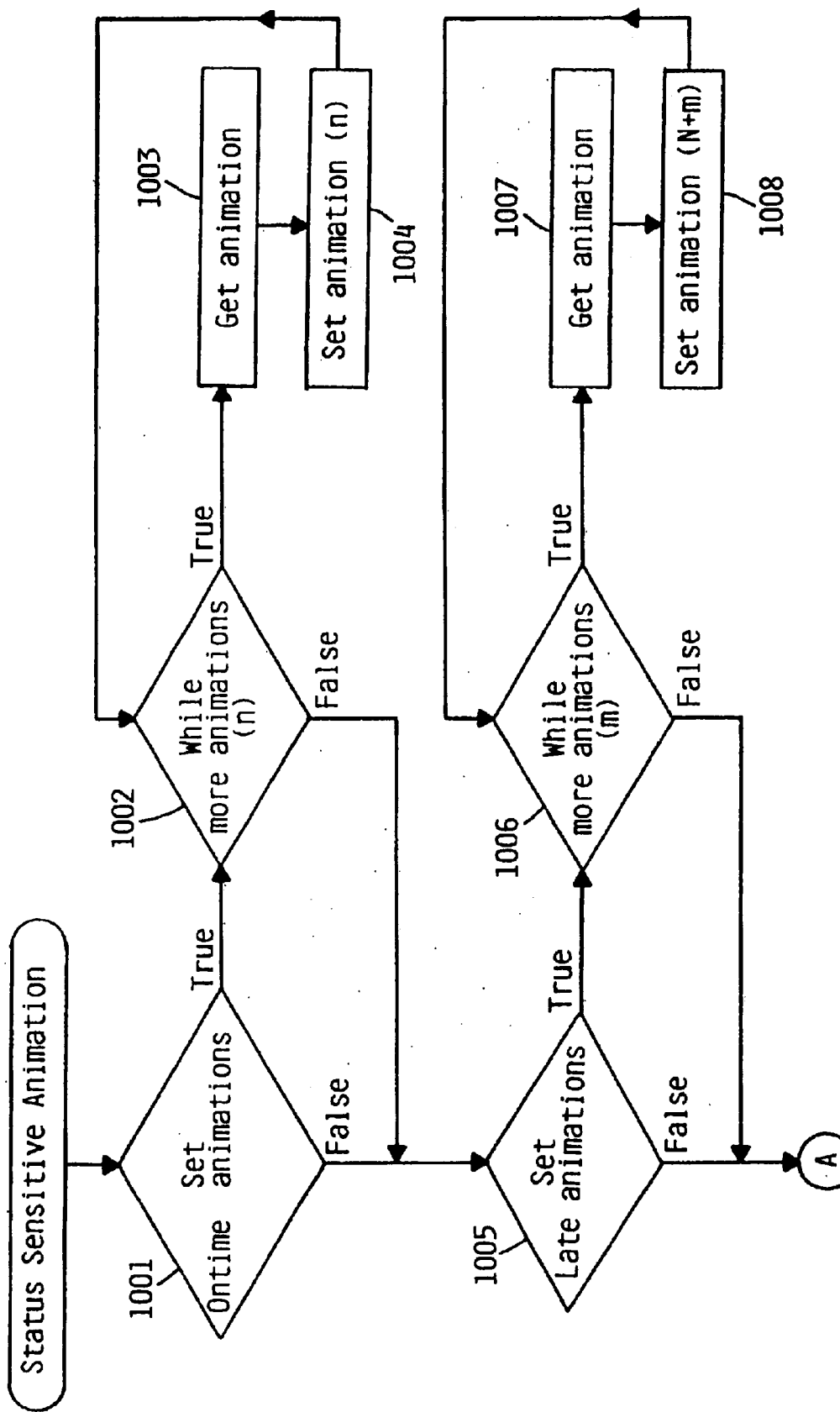
FIG. 10 illustrates the steps for processing a status sensitive animation, according to the preferred embodiment.
Figure 10B:
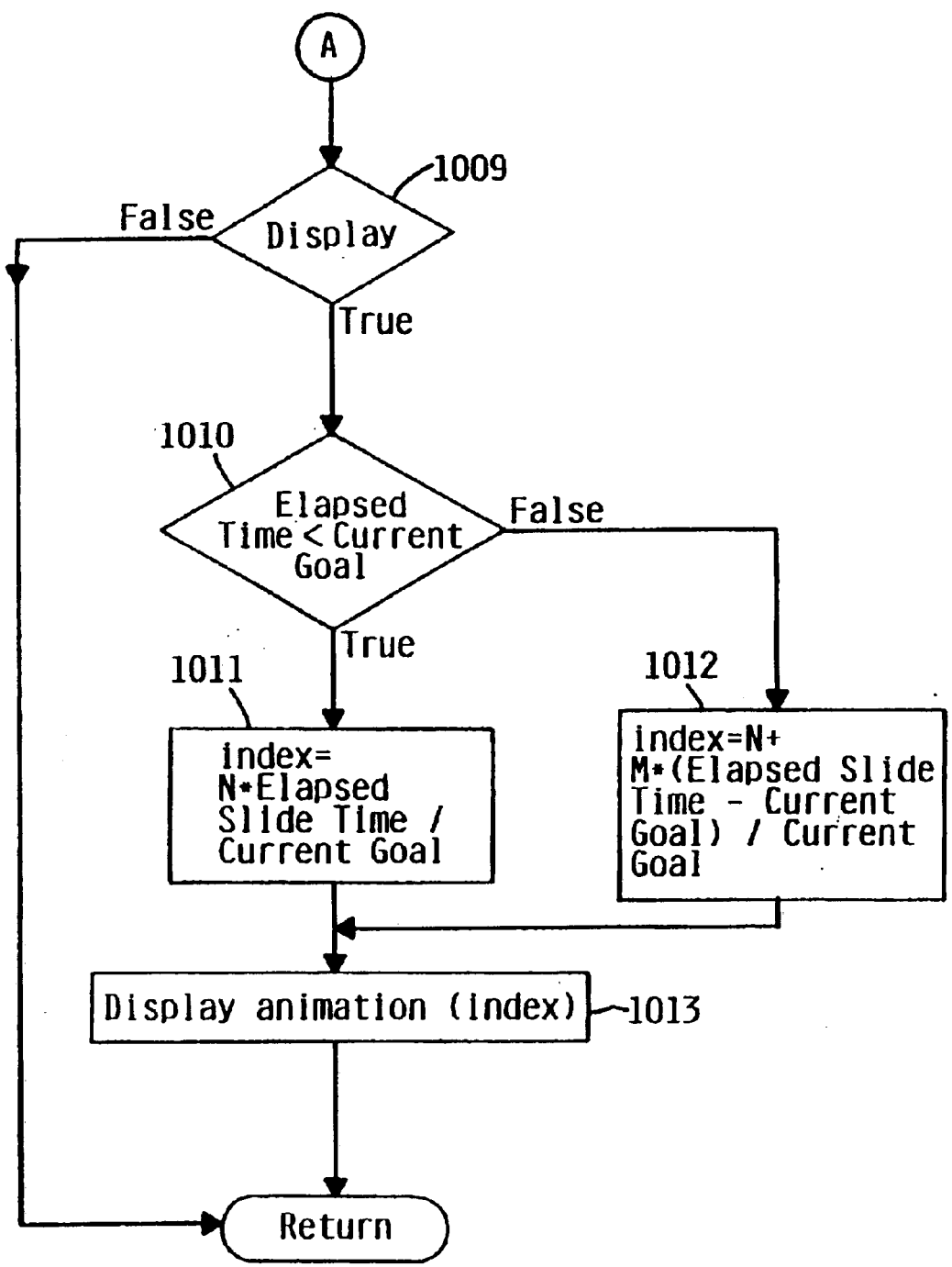

A status sensitive animation object is an animated image which changes appearance depending on the progress made by the speaker. In the example of FIG. 7, the light bulb to the right of "Main Topic" is a status sensitive animation. The light bulb may change appearance, as by changing color, or emitting "rays" at a different rate, or in some other manner, to indicate that the speaker is running late in the current frame. Multiple sequential animations may be used to give a more granular indication of the speaker's progress. FIG. 10 illustrates a procedure for processing a status sensitive animation object.

As shown in FIG. 10, if on-time animations are to be set (step 1001), the application in turn processes each animation of N animations until done (step 1002), by retrieving an animation (step 1003) and setting the animation for display as animation n (step 1004). Animations would typically be retrieved from a library of animations accompanying the presentation assist application, although it would theoretically be possible for a user to create his own animations. If late animations are to be set (step 1005), a similar procedure is followed at steps 1006–1008 to set M animations used for late indications. If the application is running in display mode(step 1009), the application compares the elapsed time in this frame with the current goal time for the frame (step 1010). If the goal has not been exceeded, the index value of the animation is computed as N*Elapsed_Time/Goal_Time (step 1011). If the goal has been exceeded, the index value of the animation is N+M*(Elapsed_Time−Goal_Time)/Goal_Time, but in no case greater than N+M (step 1012). The corresponding animation is then displayed (step 1013).

Figure 11:
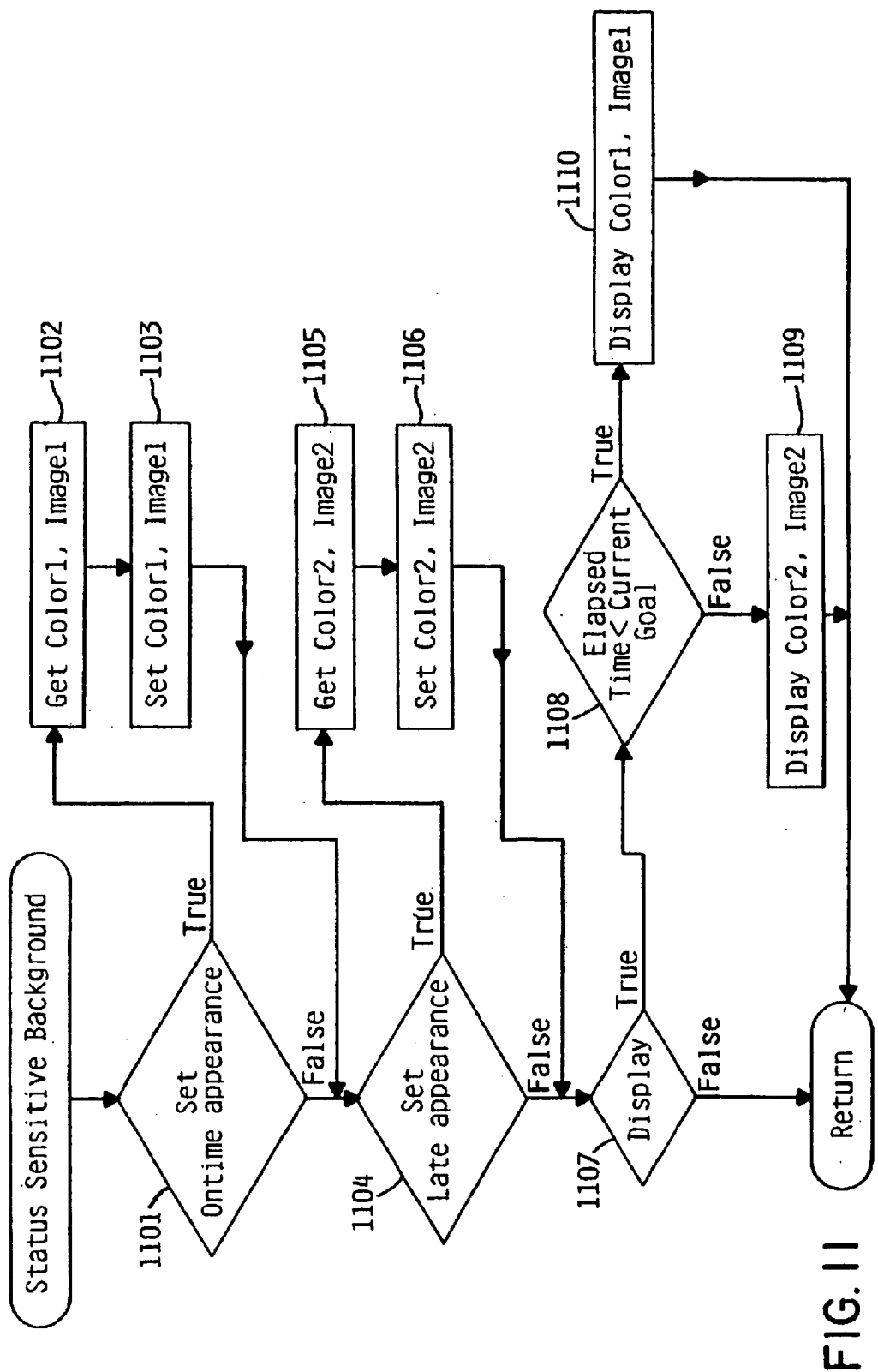
FIG. 11 illustrates the steps for processing a status sensitive background, according to the preferred embodiment.

Status sensitive background 714 is background within the presentation which changes its appearance (e.g., color or background image) as an indication of the speaker's progress. FIG. 11 illustrates a procedure for processing a status sensitive background object. In this simple example, the status sensitive text has only two possible appearances, one for the normal case, and a second when the speaker is running late in the current frame, it being understood that more than two background combinations could be used for additional indicators.

As shown in FIG. 11, if on-time background appearance is to be set (step 1101), the application retrieves the background object's image and color (step 1102, and sets on-time appearance attributes to Color1 and Image1 corresponding to on-time performance (step 1103). Setting attributes may be accomplished with any of various conventional editing tools. If late appearance is to be set (step 1104), the application retrieves the image and color (step 1105), and sets late appearance attributes to Color2 and Image 2 corresponding to late performance (step 1106). If the application is running in display mode (step 1107), the application compares the elapsed time in this frame with the current goal time for the frame (step 1108), and displays the first set of background attributes if elapsed time is less than the current goal (step 1110), and the second set of background attributes if it is greater than the current goal (step 1109).

Figure 12A:
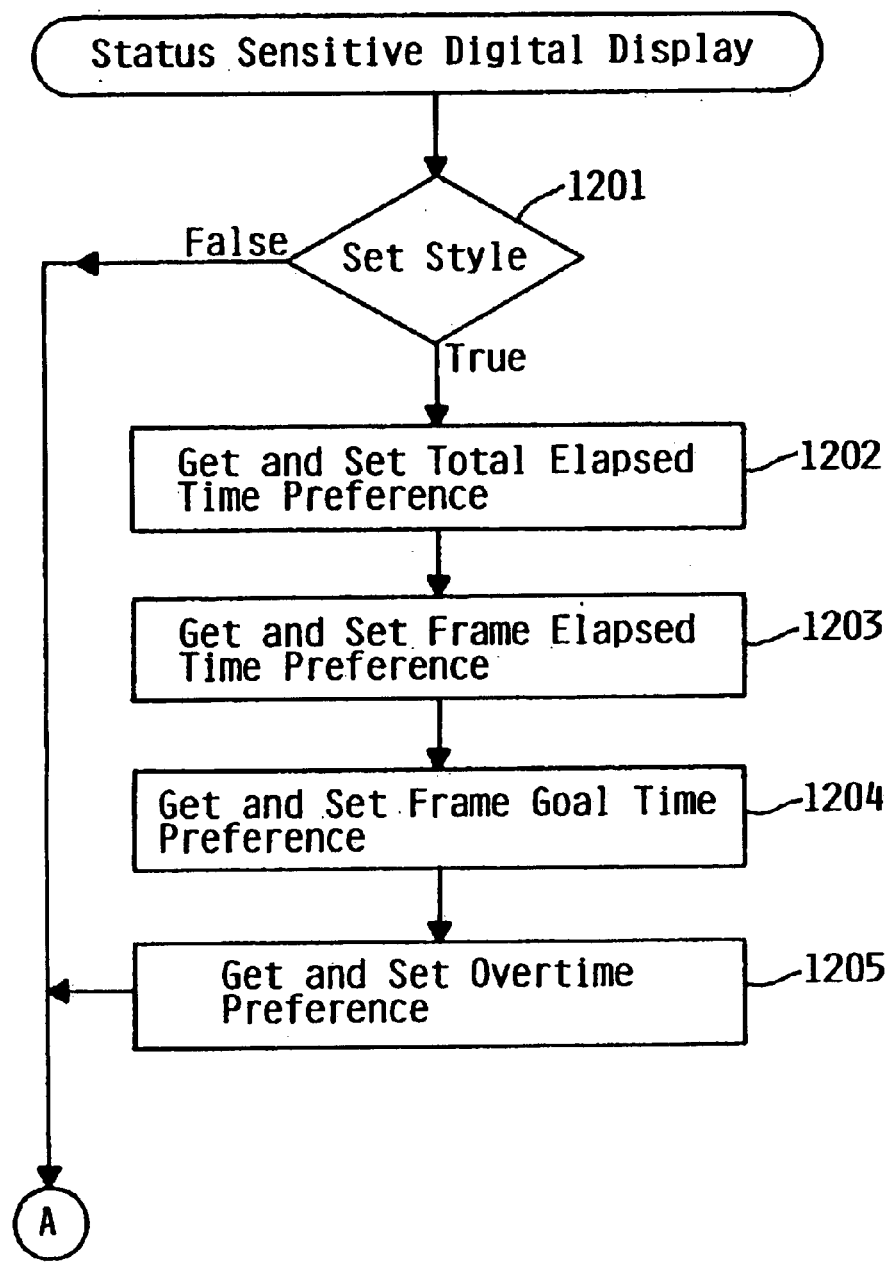
FIG. 12 illustrates the steps for processing a status sensitive digital display object, according to the preferred embodiment.
Figure 12B:
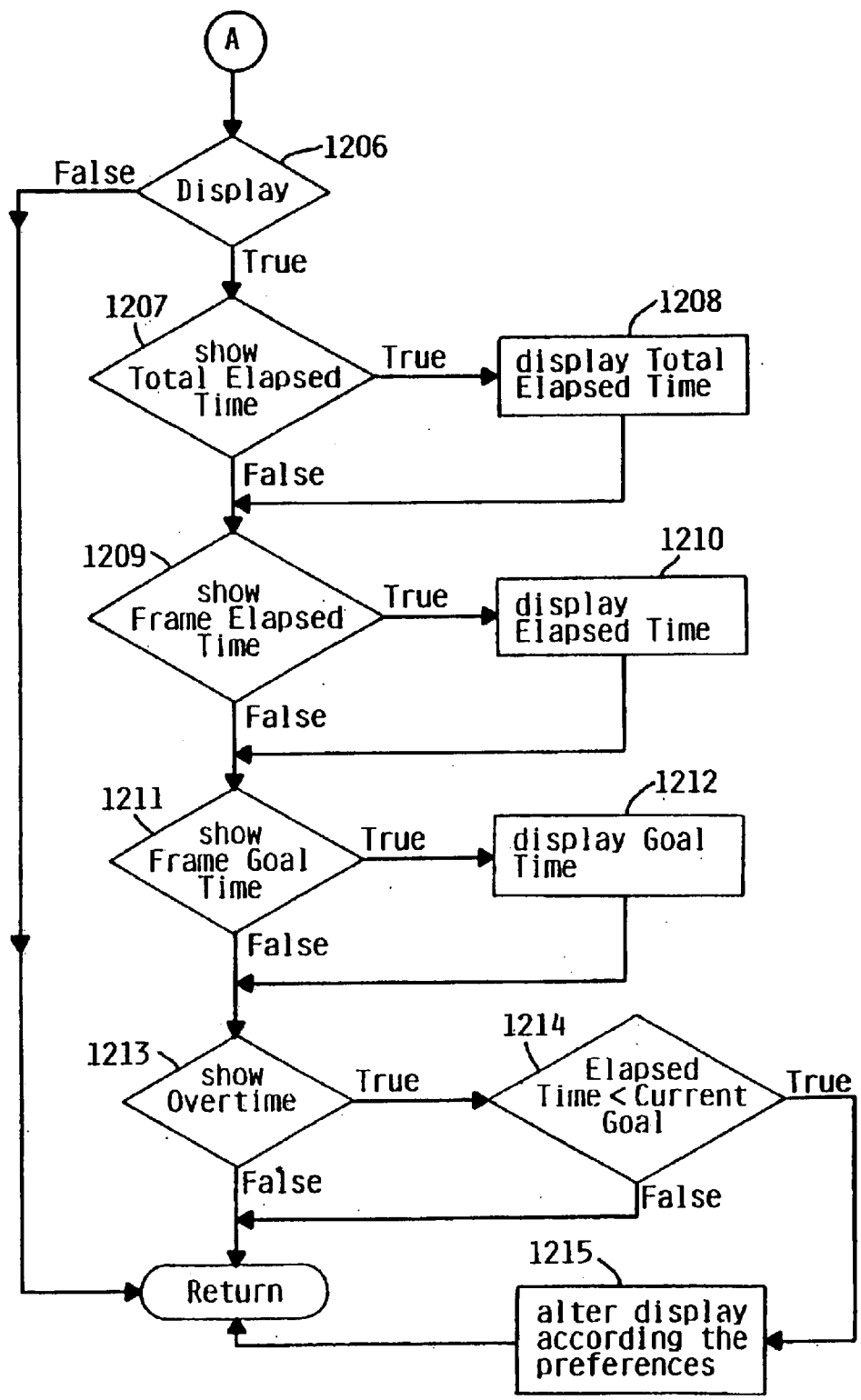

A status sensitive digital display 715 is a small area of the frame which displays numeric progress information. In the preferred embodiment, the digital display 715 displays the total elapsed time for the presentation; the total "overtime", i.e., time the speaker is behind his goal; the elapsed time in the current frame; and the goal time for the current frame. FIG. 12 illustrates the procedure for processing a status sensitive digital display object.

As shown in FIG. 12, if the attributes of the status sensitive digital display are to be set (step 1201), the application retrieves and sets the attributes of total elapsed time display (step 1202), frame elapsed time (step 1203), frame goal time (step 1204) and overtime (step 1205). Such attributes may include whether or not to display the particular quantity, the identifying text for the quantity, the font, etc. Setting attributes may be accomplished with any of various conventional editing tools. If the application is running in display mode (step 1206), the application checks the appropriate attribute to determine whether total elapsed time should be displayed (step 1207), and if so displays total elapsed time according to the selected attributes (step 1208). If the frame elapsed time should be displayed (step 1209), the application displays frame elapsed time according the set attributes (step 1210). If the frame goal time is to be displayed (step 1211), the application displays frame goal time (step 1212). If overtime is to be displayed (step 1213), the application determines whether the total elapsed time exceeds the goal times of the frames presented so far (step 1214). If so, the overtime is displayed in the status sensitive digital display, according to the set attributes (step 1215). Overtime is not displayed if it is zero (the "F" branch from step 1214).

A status sensitive histogram 716 is a pair of horizontal lines near the bottom of the frame representing total elapsed time (as a percentage or total time available) and elapsed time in the current frame (as a percentage of goal time). The procedure for processing a status sensitive histogram is similar to the procedure for processing a disguised histogram explained above with respect to FIG. 9, although the attributes which may be set are not necessarily the same.

Figure 13A:
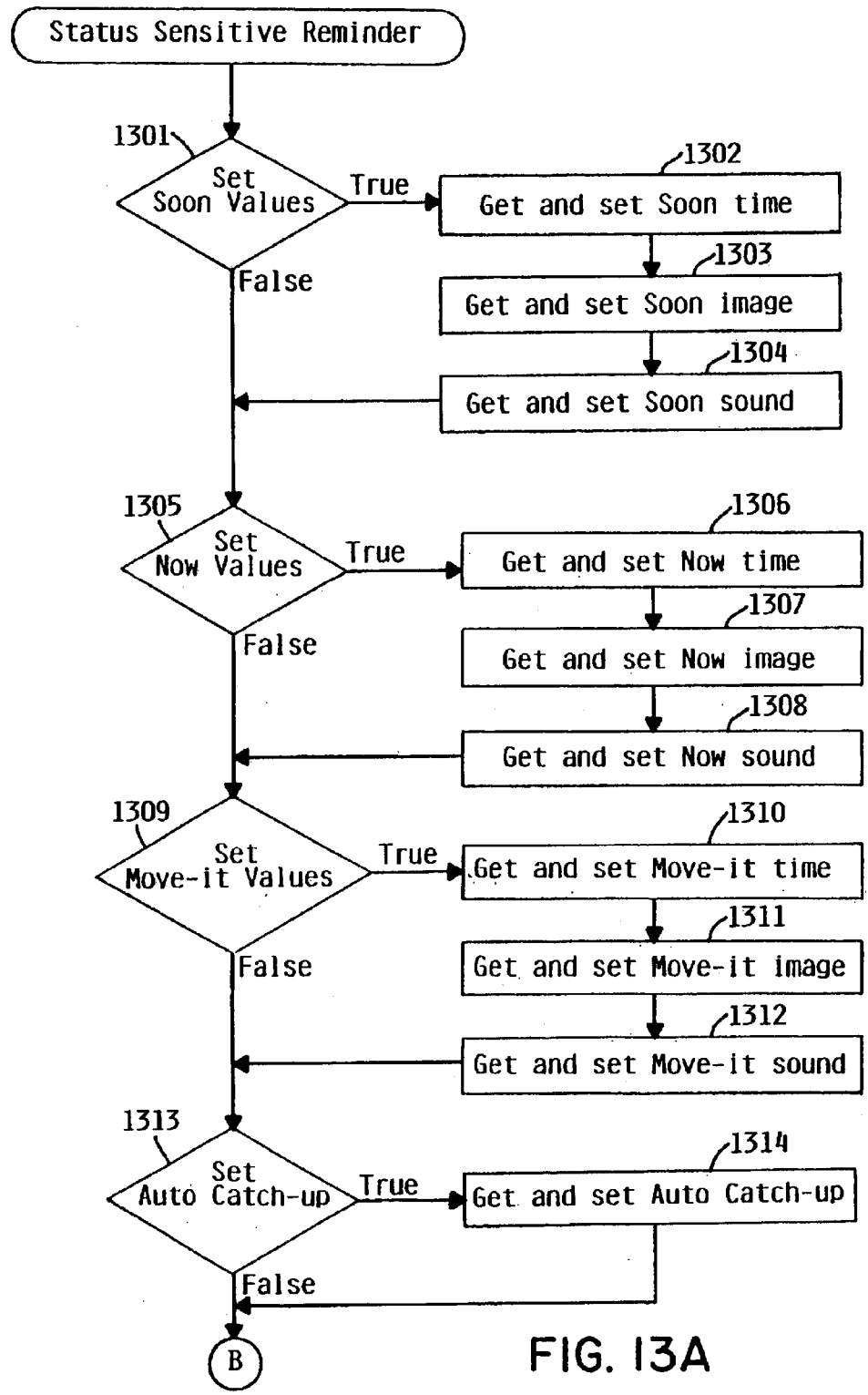
FIGS. 13A and 13B illustrate the steps for processing a status sensitive reminder object, according to the preferred embodiment.
Figure 13B:
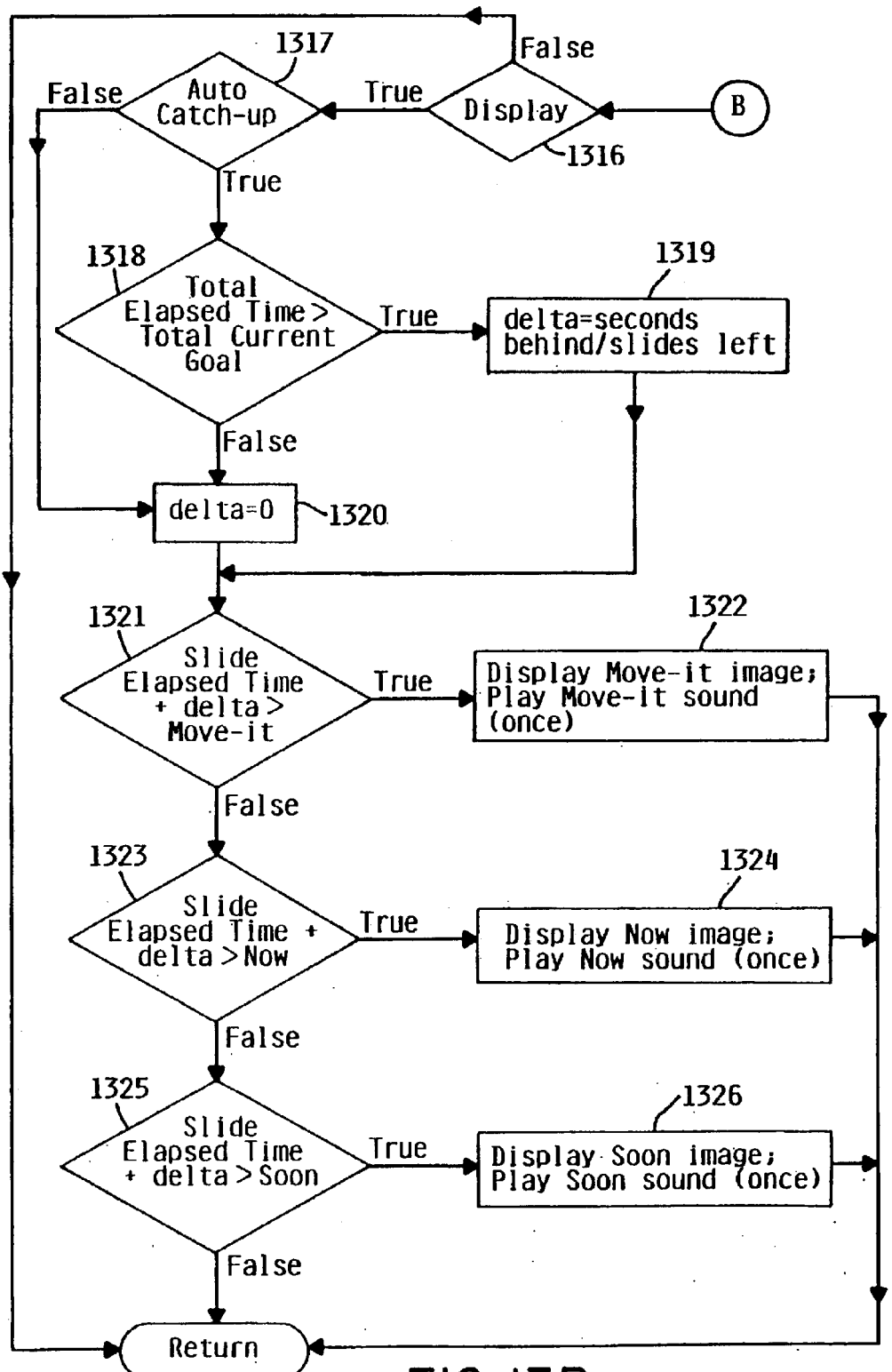

A status sensitive reminder 717 is an icon in a corner of the frame, preferably accompanied by a sound, which reminds the speaker that it is time (or almost time) to move on to the next frame. In the preferred embodiment, the status sensitive reminder may assume one of three appearances, or not be displayed at all. A first appearance (a "soon" reminder) indicates it is time to change frames soon, a second (a "now" reminder) that it is time now, and a third (a "move-it" reminder) that it is significantly past the time when the frame should be changed. The appearance of the icon may change, e.g., by changing color, changing size, by blinking or alternating size, by displaying a double arrow, etc, and the sound may change. FIGS. 13A and 13B illustrate the procedure for processing a status sensitive reminder object.

As shown in FIGS. 13A and 13B, if the attributes of a "soon" status sensitive reminder is to be set (step 1301), the application retrieves and sets the soon threshold time (step 1302), the icon and its attributes to be used (step 1303), and the accompanying sound, if any (step 1304). If the "now" status sensitive reminder is to be set (step 1305), the application retrieves and sets the now threshold time (step 1306), the icon and its attributes to be used (step 1307), and the accompanying sound, if any (step 1308). If the "move-it" status sensitive reminder is to be set (step 1309), the application retrieves and sets the move-it threshold time (step 1310), the icon and its attributes to be used (step 1311), and the accompanying sound, if any (step 1312). The threshold times are the times after which the respective status sensitive reminders will appear; they are preferably set relative to the goal time to accommodate goal time adjustments (e.g., soon threshold equals goal time minus 30 seconds), although they could be set as absolute values. If the "Auto catch-up" feature is to be set (step 1313), the application retrieves and sets the auto catch-up attribute (step 1314). Auto catch-up is a feature whereby the threshold times for displaying status sensitive reminders are dynamically changed to display a little sooner (i.e., "catch-up") when the speaker is behind schedule. Setting any of the above attributes may be accomplished with any of various conventional editing tools.

If the application is running in display mode (step 1316), the application checks the setting of the auto catch-up feature (step 1317). If auto catch-up is on, the application compares total elapsed time to total goal time of frames presented (1318). If elapsed time is more than the goal times (the speaker is behind), a delta is computed as the total time behind schedule divided by the number of frames left (step 1319); otherwise, delta is set to 0 (step 1320). If the time elapsed plus delta is greater than the move-it threshold (step 1321), then the move-it image is displayed and the sound is activated (step 1322). If the time elapsed plus delta is greater than the now threshold (step 1323), then the now image is displayed and the sound is activated (step 1324). If the time elapsed plus delta is greater than the soon threshold (step 1325), then the soon image is displayed and the sound is activated (step 1326).

While various progress indicators have been described herein and shown in FIG. 7, it will be appreciated that other progress indicators could be used, that the progress indicators described could be used to represent different time quantities or events, that the placement or other appearance of the progress indicators could vary, etc.

While various specific formulae for computing the automatically readjusting goal times to fit an available schedule or time remaining have been disclosed herein, it will be appreciated by those skilled in the art that many variations in the detailed formulae are possible. For example, priorities could be defined as relative weights of importance, so that the adjustment formulae would include the priority of a frame as a coefficient in one or more equations. Additionally, the scheduled time for the presentation itself could be variable within a given range, so that there would be an overall target time to completion, and a cost associated with varying from the target time. This cost could be compared with costs of varying from different frame goal times to achieve an optimum cost presentation, which would not necessarily complete at exactly the target time. Many other variations in formulae are possible, and the present invention should not be deemed limited to the specific method disclosed as the preferred embodiment herein.

In the preferred embodiment, a readjust goals function which automatically readjusts goal times to fit a schedule is part of a larger presentation assist application which also has the capability to create and edit presentations, run presentations, run practices, and so forth. However, these additional capabilities of the presentation assist application are merely typical capabilities that such an application might have or are capabilities which would be useful for establishing goal times, and are not necessarily required for practicing the present invention.

In the preferred embodiment, projector 104 or other display device displays to the audience a replica of the screen image shown to the speaker on his computer system. By using a replica of the screen image, it is not necessary to create multiple screen images, and a standard video output port of computer system 105 may be used, thus simplifying the implementation and potentially reducing the amount of hardware required. However, in an alternative embodiment, the information presented to the audience would not necessarily have to be replicas of images displayed on computer system 105. It would be possible, for example, to create different sets of video images for the audience and for the speaker. As a further alternative, the images shown to the audience need not be generated by computer system 105 at all. For example, the images shown to the audience might be generated by conventional slide projectors, foil projectors, motion pictures, or other means. The devices which generate such images could, e.g., be manually operated in synchronization with cues from computer system 105, or there could be some electronic communication path between computer 105 and the image generating device whereby they remain in synchronization.

In the preferred embodiment described above, time intervals can be dynamically adjusted to fit available time constraints. However, another aspect of this embodiment is providing the speaker with information in a manner unlikely to distract the audience, particularly, by embedding the information in the frames in a non-textual coded form which is meaningless to the audience, various examples of which are provided above. It will be appreciated that it would be possible to dynamically adjust time intervals without using the preferred method of embedding information in the frames in non-textual coded form, although some indicia of progress should be provided. It will further be appreciated that it would be possible to provide information to the speaker in such a non-textual coded form without having the capability to dynamically adjust time intervals to fit available time constraints.

Although a specific embodiment of the invention has been disclosed along with certain alternatives, it will be recognized by those skilled in the art that additional variations in form and detail may be made within the scope of the following claims:

What is claimed is:

1. A method for assisting a speaker presentation before an audience, comprising the steps of:

displaying a plurality of frames to said audience during said presentation, each frame being associated with at least one respective pre-defined frame time interval;

changing frames displayed to said audience responsive to interactive user frame change commands, said commands being made during said presentation;

determining a time remaining to expiration of an assigned presentation time interval, said determining step being performed automatically by a digital data processing device;

monitoring said interactive user frame change commands during said presentation to determine a set of frames not yet displayed, said monitoring step being performed automatically by a digital data processing device;

responsive to said monitoring step and said determining step, adjusting at least one said frame time interval associated with a frame of said set of frames not yet displayed by automatically determining a respective amount of time interval adjustment for at least one of said frames based on said time remaining to expiration of said presentation time interval, said adjusting step being performed automatically by a digital data processing device; and providing indicia of said at least one adjusted frame time interval to a speaker, said step of providing indicia being performed automatically by a digital data processing device.

2. The method for assisting a speaker presentation of claim 1, wherein said adjusting step adjusts at least one frame time interval to zero, thereby removing the frame from said presentation.

3. The method for assisting a speaker presentation of claim 1, wherein each frame is associated with at least two respective frame time intervals, a first respective time interval indicating a minimum time required for presenting the associated frame to the audience, and a second respective time interval indicating a goal time for presenting the associated frame to said audience.

4. The method for assisting a speaker presentation of claim 1, further comprising the step of:

associating a respective priority with each said frame;

wherein said step of automatically adjusting at least one said frame time interval adjusts said frame time interval based on the respective priorities of the frames.

5. The method for assisting a speaker presentation of claim 1, wherein said step of displaying a plurality of frames to said audience comprises:

displaying a first copy of each respective frame of said plurality of frames to said speaker on an interactive system controlled by said speaker; and simultaneously displaying a second copy of each respective frame of said plurality of frames to said audience.

6. The method for assisting a speaker presentation of claim 1, wherein said step of providing indicia of said at least one adjusted frame time interval comprises providing presentation time status information as non-textual coded information embedded within said plurality of frames.

7. The method for assisting a speaker presentation of claim 6, wherein said step of providing indicia of said at least one adjusted frame time interval comprises encoding said presentation time status information as at least one appearance characteristic of text information within said plurality of frames, wherein the text of said text information does not change in response to said presentation time status.

8. The method for assisting a speaker presentation of claim 6, wherein said step of providing indicia of said at least one adjusted frame time interval presentation time status information comprises encoding said presentation time status information as at least one appearance characteristic of a background of said plurality of frames.

9. The method for assisting a speaker presentation of claim 6, wherein said step of providing indicia of said at least one adjusted frame time interval comprises encoding said presentation time status information as at least one appearance characteristic of an icon.

10. The method for assisting a speaker presentation of claim 6, wherein said step of providing indicia of said at least one adjusted frame time interval comprises encoding said presentation time status information as at least one appearance characteristic of a background of said plurality of frames.

11. A method for assisting a speaker presentation before an audience, comprising the steps of:

displaying a plurality of frames to said audience during said presentation, each frame being associated with at least one respective pre-defined frame time interval;

changing frames displayed to said audience responsive to interactive user frame change commands, said commands being made during said presentation;

determining a time remaining to expiration of an assigned presentation time interval;

automatically monitoring said interactive user frame change commands during said presentation to determine a set of frames not yet displayed;

responsive to said automatically monitoring step and said determining step, adjusting at least one said frame time interval associated with a time frame of said set of frames not yet displayed based on said time remaining to expiration of said presentation time interval, said adjusting step being performed automatically by a digital data processing device; and providing indicia of said at least one adjusted frame time interval to a speaker;

wherein said step of providing indicia of said at least one adjusted frame time interval comprises providing presentation time status information as non-textual coded information embedded within said plurality of frames;

wherein said step of providing indicia of said at least one adjusted frame time interval comprises encoding said presentation time status information as at least one unannotated histogram.

12. The method for assisting a speaker presentation of claim 11, wherein said unannotated histogram is a disguised histogram comprising at least one status symbol positioned on a reference feature, the position of the status symbol providing presentation time status information.

13. A computer program product for assisting a speaker presentation before an audience, said computer program product comprising:

a plurality of processor executable instructions recorded on signal-bearing media, wherein said instructions, when executed by at least one processor, cause the computer to perform the steps of:

displaying a plurality of frames to said audience during said presentation, each frame being associated with at least one respective pre-defined frame time interval;

changing frames displayed to said audience responsive to interactive user frame change commands, said commands being made during said presentation;

automatically determining a time remaining to expiration of an assigned presentation time interval;

automatically monitoring said interactive user frame change commands during said presentation to determine a set of frames not yet displayed;

responsive to said automatically monitoring step and said automatically determining step, automatically adjusting at least one said frame time interval associated with a frame of said set of frames not yet displayed by automatically determining a respective amount of time interval adjustment for at least one of said frames based on said time remaining to expiration of said presentation time interval; and providing indicia of said at least one adjusted frame time interval to a speaker.

14. The computer program product for assisting a speaker presentation of claim 13, wherein said adjusting step adjusts at least one frame time interval to zero, thereby removing the frame from said presentation.

15. The computer program product for assisting a speaker presentation of claim 13, wherein each frame is associated with at least two respective frame time intervals, a first respective time interval indicating a minimum time required for presenting the associated frame to the audience, and a second respective time interval indicating a goal time for presenting the associated frame to said audience.

16. The computer program product for assisting a speaker presentation of claim 13, wherein a respective priority is associated with each said frame; and wherein said step of automatically adjusting at least one said frame time interval adjusts said frame time interval based on the respective priorities of the frames.

17. The computer program product for assisting a speaker presentation of claim 13, wherein said instructions further cause the computer to perform the step of:

collecting presentation time statistics from a plurality of practice presentations.

18. An apparatus for assisting a speaker presentation before an audience, comprising:

a data storage mechanism for storing a plurality of frames for presentation to said audience, each frame being associated with at least one respective frame time interval;

at least one display device for displaying said plurality of frames to said audience;

an interactive display function which retrieves frames from said data storage mechanism and causes frames to be displayed on said at least one display device, responsive to presentation control commands received from a user during said speaker presentation, said presentation control commands interactively controlling the times at which frames are displayed to said audience;

an automatic monitoring function which automatically determines a time remaining to expiration of an assigned presentation time interval;

an automatic adjusting function which automatically determines a respective amount of adjustment for at least one said frame time interval associated with a frame not yet displayed based on said time remaining to expiration of an assigned presentation time interval;

an automatic feedback function which automatically provides indicia of said respective amount of adjustment for at least one frame time interval to a speaker.

19. The apparatus for assisting a speaker presentation of claim 18, wherein said feedback function provides presentation time status information as non-textual coded information embedded within said plurality of frames.

* * * * *